US009348687B2

(12) United States Patent
Boger

(10) Patent No.: US 9,348,687 B2
(45) Date of Patent: *May 24, 2016

(54) DETERMINING A NUMBER OF UNIQUE INCIDENTS IN A PLURALITY OF INCIDENTS FOR INCIDENT PROCESSING IN A DISTRIBUTED PROCESSING SYSTEM

(71) Applicant: International Business Machines Corporation, Armonk, NY (US)

(72) Inventor: Lynn A. Boger, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/299,311

(22) Filed: Jun. 9, 2014

(65) Prior Publication Data

US 2015/0195165 A1    Jul. 9, 2015

Related U.S. Application Data

(63) Continuation of application No. 14/148,829, filed on Jan. 7, 2014.

(51) Int. Cl.
*G06F 11/00*    (2006.01)
*G06F 11/07*    (2006.01)
(Continued)

(52) U.S. Cl.
CPC ........ *G06F 11/0787* (2013.01); *G06F 11/0775* (2013.01); *H04L 41/0618* (2013.01); *H04L 43/08* (2013.01)

(58) Field of Classification Search
USPC ....................................................... 714/20
See application file for complete search history.

(56) References Cited

U.S. PATENT DOCUMENTS

| 4,812,852 A | 3/1989 | Bent et al. |
| 4,823,261 A | 4/1989 | Bank et al. |
| 4,965,772 A | 10/1990 | Daniel et al. |

(Continued)

FOREIGN PATENT DOCUMENTS

| CN | 101026494 | 8/2007 |
| CN | 101739745 | 6/2010 |
| JP | 2007094997 | 4/2007 |

OTHER PUBLICATIONS

Zhao, Q., et al., "Dynamic Memory Optimization using Pool Allocation and Prefetching", ACM SIGARCH Computer Architecture News, Dec. 2005, pp. 27-32, vol. 33, No. 5, ACM, New York, NY, USA.

(Continued)

*Primary Examiner* — Kamini Patel
(74) *Attorney, Agent, or Firm* — Edward J. Lenart; Feb Cabrasawan; Kennedy Lenart Spraggins LLP

(57) ABSTRACT

Methods, apparatuses, and computer program products for determining a number of unique incidents in a plurality of incidents for incident processing in a distributed processing system are provided. Embodiments include an incident analyzer identifying within the plurality of incidents, attribute combination entries of location identifications and incident types and analyzing each location identification in each attribute combination entry according to a sequence of the attribute combination entries including creating attribute pairs. The incident analyzer is also configured to count the attribute pairs. The number of attribute pairs is the number of unique incidents in the plurality of incidents.

6 Claims, 10 Drawing Sheets

(51) Int. Cl.
*H04L 12/26* (2006.01)
*H04L 12/24* (2006.01)

(56) References Cited

U.S. PATENT DOCUMENTS

| | | |
|---|---|---|
| 5,119,377 A | 6/1992 | Cobb et al. |
| 5,276,861 A | 1/1994 | Howarth |
| 5,515,285 A | 5/1996 | Garrett et al. |
| 5,535,380 A | 7/1996 | Bergkvist et al. |
| 5,581,242 A | 12/1996 | Arita et al. |
| 5,689,636 A | 11/1997 | Kleber et al. |
| 5,777,549 A | 7/1998 | Arrowsmith et al. |
| 5,991,881 A | 11/1999 | Conklin et al. |
| 6,094,681 A | 7/2000 | Shaffer et al. |
| 6,255,943 B1 | 7/2001 | Lewis et al. |
| 6,314,533 B1 | 11/2001 | Novik et al. |
| 6,373,383 B1 | 4/2002 | Arrowsmith et al. |
| 6,401,116 B1 | 6/2002 | Okigami et al. |
| 6,405,250 B1 | 6/2002 | Lin et al. |
| 6,446,136 B1 | 9/2002 | Pohlmann et al. |
| 6,446,224 B1 | 9/2002 | Chang et al. |
| 6,513,129 B1 | 1/2003 | Tentij et al. |
| 6,539,335 B1 | 3/2003 | Morris et al. |
| 6,594,786 B1 | 7/2003 | Connelly et al. |
| 6,606,610 B1 | 8/2003 | Gray et al. |
| 6,631,409 B1 | 10/2003 | Watson et al. |
| 6,704,874 B1 | 3/2004 | Porras et al. |
| 6,708,288 B1 | 3/2004 | Ziegler et al. |
| 6,754,854 B2 | 6/2004 | Kurrasch |
| 6,801,927 B1 | 10/2004 | Smith et al. |
| 6,871,349 B1 | 3/2005 | Akhond et al. |
| 6,889,169 B2 | 5/2005 | Kirshenbaum et al. |
| 6,915,285 B2 | 7/2005 | Gray et al. |
| 6,918,059 B1 | 7/2005 | Galuten et al. |
| 6,925,586 B1 | 8/2005 | Perrella et al. |
| 6,988,208 B2 | 1/2006 | Hrabik et al. |
| 6,990,601 B1 | 1/2006 | Tsuneya et al. |
| 7,043,659 B1 | 5/2006 | Klein et al. |
| 7,117,391 B1 | 10/2006 | Hornick et al. |
| 7,213,179 B2 | 5/2007 | Song et al |
| 7,251,584 B1 | 7/2007 | Perazolo et al. |
| 7,251,829 B1 | 7/2007 | Pagdin et al. |
| 7,263,553 B2 | 8/2007 | Gaspard |
| 7,281,172 B2 | 10/2007 | Chujo |
| 7,289,988 B2 | 10/2007 | Joseph |
| 7,299,152 B1 | 11/2007 | Moritz |
| 7,430,692 B2 | 9/2008 | White et al. |
| 7,437,614 B2 * | 10/2008 | Haswell .......... G06F 11/3684 714/38.13 |
| 7,457,805 B2 | 11/2008 | Deen et al. |
| 7,469,239 B2 | 12/2008 | Musman |
| 7,568,027 B2 | 7/2009 | Becker et al. |
| 7,599,359 B1 | 10/2009 | Croak et al. |
| 7,603,711 B2 | 10/2009 | Scheidell |
| 7,606,891 B1 | 10/2009 | Shyu et al. |
| 7,613,741 B2 | 11/2009 | Lu et al. |
| 7,617,074 B2 | 11/2009 | Beish et al. |
| 7,673,335 B1 | 3/2010 | Chakravarty et al. |
| 7,687,066 B2 | 3/2010 | Fujino et al. |
| 7,702,782 B1 | 4/2010 | Pai |
| 7,756,053 B2 | 7/2010 | Thomas et al. |
| 7,792,042 B2 | 9/2010 | Golla et al. |
| 7,815,103 B2 | 10/2010 | Timmis et al. |
| 7,822,848 B2 | 10/2010 | Muller et al. |
| 7,872,982 B2 | 1/2011 | Atkins et al. |
| 7,904,319 B1 | 3/2011 | Whear et al. |
| 7,954,159 B2 | 5/2011 | Hrabik et al. |
| 7,979,355 B2 | 7/2011 | Shah et al. |
| 7,984,452 B2 | 7/2011 | Chakravarty et al. |
| 7,996,046 B2 | 8/2011 | Vargas et al. |
| 8,020,045 B2 | 9/2011 | Morimura et al. |
| 8,041,799 B1 | 10/2011 | Usery et al. |
| 8,135,863 B2 | 3/2012 | Nekovee et al. |
| 8,156,553 B1 * | 4/2012 | Church .......... G06Q 10/06 709/224 |
| 8,248,228 B2 | 8/2012 | Hollender |
| 8,314,694 B2 | 11/2012 | Naedele et al. |
| 8,321,865 B2 | 11/2012 | Amini et al. |
| 8,347,143 B2 | 1/2013 | Atkins et al. |
| 8,350,681 B2 | 1/2013 | Bells |
| 8,364,813 B2 | 1/2013 | Atkins et al. |
| 8,380,838 B2 | 2/2013 | Bose et al. |
| 8,386,602 B2 | 2/2013 | Carey et al. |
| 8,417,809 B1 | 4/2013 | Lancaster et al. |
| 8,418,247 B2 | 4/2013 | Sinnaya et al. |
| 8,458,530 B2 | 6/2013 | Kini et al. |
| 8,495,661 B2 | 7/2013 | Carey et al. |
| 8,676,883 B2 | 3/2014 | Atkins et al. |
| 8,688,769 B2 | 4/2014 | Atkins et al. |
| 8,737,231 B2 | 5/2014 | Carey et al. |
| 8,769,096 B2 | 7/2014 | Carey et al. |
| 8,775,917 B2 | 7/2014 | Bourke et al. |
| 8,825,836 B1 | 9/2014 | Gibson et al. |
| 8,832,219 B2 | 9/2014 | Morgan |
| 8,856,807 B1 | 10/2014 | Khapre et al. |
| 8,868,986 B2 | 10/2014 | Carey et al. |
| 8,959,063 B2 | 2/2015 | Haeberle et al. |
| 8,966,505 B1 | 2/2015 | Neilan |
| 2001/0055963 A1 | 12/2001 | Cloutier |
| 2002/0016871 A1 | 2/2002 | Graf |
| 2002/0077836 A1 | 6/2002 | Elnozahy et al. |
| 2002/0095595 A1 | 7/2002 | Christopherson et al. |
| 2003/0026525 A1 | 2/2003 | Alvarez |
| 2003/0061514 A1 | 3/2003 | Bardsley et al. |
| 2003/0200187 A1 | 10/2003 | Gray et al. |
| 2004/0030531 A1 | 2/2004 | Miller et al. |
| 2004/0153693 A1 | 8/2004 | Fisher et al. |
| 2004/0181294 A1 | 9/2004 | Deitz et al. |
| 2004/0221025 A1 | 11/2004 | Johnson et al. |
| 2004/0243905 A1 | 12/2004 | Merritt |
| 2005/0010545 A1 | 1/2005 | Joseph |
| 2005/0034130 A1 | 2/2005 | Skovira |
| 2005/0183093 A1 | 8/2005 | Pope et al. |
| 2005/0193285 A1 | 9/2005 | Jeon |
| 2005/0210331 A1 | 9/2005 | Connelly et al. |
| 2005/0240547 A1 | 10/2005 | Gray et al. |
| 2005/0246288 A1 | 11/2005 | Kimura et al. |
| 2006/0015608 A1 | 1/2006 | Becker et al. |
| 2006/0020942 A1 | 1/2006 | Ly et al. |
| 2006/0085724 A1 | 4/2006 | Merritt |
| 2006/0129947 A1 | 6/2006 | Hamzy et al. |
| 2006/0168185 A1 | 7/2006 | McCall et al. |
| 2006/0174251 A1 | 8/2006 | Pope et al. |
| 2006/0271784 A1 | 11/2006 | Bolosky et al. |
| 2006/0282419 A1 | 12/2006 | Sen et al. |
| 2007/0002736 A1 | 1/2007 | Gade |
| 2007/0033594 A1 | 2/2007 | Allen et al. |
| 2007/0037521 A1 | 2/2007 | Babut et al. |
| 2007/0073708 A1 | 3/2007 | Smith et al. |
| 2007/0088755 A1 | 4/2007 | Nesbitt et al. |
| 2007/0100836 A1 | 5/2007 | Eichstaedt |
| 2007/0100959 A1 | 5/2007 | Eichstaedt et al. |
| 2007/0100960 A1 | 5/2007 | Eichstaedt |
| 2007/0124437 A1 | 5/2007 | Chervets |
| 2007/0136237 A1 | 6/2007 | Barker et al. |
| 2007/0174768 A1 | 7/2007 | Sen et al. |
| 2007/0177523 A1 | 8/2007 | Nagami et al. |
| 2007/0180103 A1 | 8/2007 | Atkins et al. |
| 2007/0222576 A1 | 9/2007 | Miller et al. |
| 2007/0294399 A1 | 12/2007 | Grossner et al. |
| 2008/0010641 A1 | 1/2008 | Zhao et al. |
| 2008/0071403 A1 | 3/2008 | Conway et al. |
| 2008/0080384 A1 | 4/2008 | Atkins et al. |
| 2008/0109683 A1 | 5/2008 | Erwin et al. |
| 2008/0155360 A1 | 6/2008 | Bates et al. |
| 2008/0196044 A1 | 8/2008 | Stanley |
| 2008/0228787 A1 | 9/2008 | Merritt |
| 2008/0235365 A1 | 9/2008 | Bansal et al. |
| 2008/0284581 A1 | 11/2008 | Sheleheda et al. |
| 2009/0006883 A1 | 1/2009 | Zhang et al. |
| 2009/0070785 A1 | 3/2009 | Alvez et al. |
| 2009/0077224 A1 | 3/2009 | Appleton |
| 2009/0094649 A1 | 4/2009 | Patel |
| 2009/0183037 A1 | 7/2009 | Hamaguchi et al. |

(56) References Cited

U.S. PATENT DOCUMENTS

| | | |
|---|---|---|
| 2009/0199051 A1 | 8/2009 | Jann et al. |
| 2009/0216881 A1 | 8/2009 | Lovy et al. |
| 2009/0275807 A1 | 11/2009 | Sitzman et al. |
| 2009/0292948 A1 | 11/2009 | Cinato et al. |
| 2009/0327429 A1 | 12/2009 | Hughes et al. |
| 2009/0328044 A1 | 12/2009 | Bergheaud et al. |
| 2010/0019894 A1 | 1/2010 | Okada |
| 2010/0031354 A1 | 2/2010 | Hudis |
| 2010/0042632 A1 | 2/2010 | Johnson et al. |
| 2010/0083382 A1 | 4/2010 | Farley et al. |
| 2010/0180150 A1 | 7/2010 | Jeddeloh |
| 2010/0192163 A1 | 7/2010 | Pope et al. |
| 2010/0211192 A1 | 8/2010 | Stluka et al. |
| 2010/0211952 A1 | 8/2010 | Kasravi et al. |
| 2010/0287615 A1 | 11/2010 | Martin et al. |
| 2010/0332918 A1 | 12/2010 | Harnois |
| 2011/0078519 A1 | 3/2011 | Yordanov et al. |
| 2011/0106941 A1 | 5/2011 | Franklin |
| 2011/0119372 A1 | 5/2011 | Rodrigues et al. |
| 2011/0122773 A1 | 5/2011 | Kung et al. |
| 2011/0145659 A1 | 6/2011 | Ikeyama |
| 2011/0161130 A1 | 6/2011 | Whalin et al. |
| 2011/0167112 A1 | 7/2011 | Mazzucco et al. |
| 2011/0193704 A1 | 8/2011 | Harper et al. |
| 2011/0200304 A1 | 8/2011 | Rutledge |
| 2011/0260879 A1 | 10/2011 | Avner |
| 2011/0275356 A1 | 11/2011 | Best et al. |
| 2011/0289142 A1* | 11/2011 | Whalin ............... G06Q 30/02 709/203 |
| 2011/0289433 A1 | 11/2011 | Whalin et al. |
| 2012/0084432 A1 | 4/2012 | Soprovich et al. |
| 2012/0110153 A1 | 5/2012 | Atkins et al. |
| 2012/0110161 A1 | 5/2012 | Carey et al. |
| 2012/0110600 A1 | 5/2012 | Carey et al. |
| 2012/0143875 A1* | 6/2012 | Sarma ............... G06F 17/30687 707/746 |
| 2012/0144020 A1 | 6/2012 | Carey et al. |
| 2012/0144021 A1 | 6/2012 | Carey et al. |
| 2012/0144243 A1 | 6/2012 | Carey et al. |
| 2012/0144251 A1 | 6/2012 | Carey et al. |
| 2012/0191527 A1* | 7/2012 | Reichert ............ G06Q 30/0255 705/14.41 |
| 2012/0239973 A1 | 9/2012 | Walton et al. |
| 2012/0275456 A1 | 11/2012 | Ammireddy |
| 2012/0303815 A1 | 11/2012 | Atkins et al. |
| 2012/0304012 A1 | 11/2012 | Atkins et al. |
| 2012/0304013 A1 | 11/2012 | Atkins et al. |
| 2012/0304022 A1 | 11/2012 | Carey et al. |
| 2012/0330918 A1* | 12/2012 | Carey ............... H04L 67/025 707/705 |
| 2012/0331332 A1 | 12/2012 | Carey et al. |
| 2012/0331347 A1 | 12/2012 | Carey et al. |
| 2012/0331485 A1 | 12/2012 | Carey et al. |
| 2013/0073726 A1 | 3/2013 | Carey et al. |
| 2013/0074102 A1 | 3/2013 | Carey et al. |
| 2013/0080630 A1 | 3/2013 | Carey et al. |
| 2013/0091386 A1 | 4/2013 | Atkins et al. |
| 2013/0097215 A1 | 4/2013 | Atkins et al. |
| 2013/0097216 A1 | 4/2013 | Carey et al. |
| 2013/0097272 A1 | 4/2013 | Atkins et al. |
| 2013/0097300 A1 | 4/2013 | Atkins et al. |
| 2013/0097310 A1 | 4/2013 | Carey et al. |
| 2013/0097619 A1 | 4/2013 | Carey et al. |
| 2013/0097620 A1 | 4/2013 | Carey et al. |
| 2013/0111502 A1 | 5/2013 | Carey et al. |
| 2013/0132460 A1 | 5/2013 | Atkins et al. |
| 2013/0138809 A1 | 5/2013 | Carey et al. |
| 2013/0144932 A1 | 6/2013 | Atkins et al. |
| 2013/0179905 A1 | 7/2013 | Atkins et al. |
| 2013/0290554 A1 | 10/2013 | Chen et al. |
| 2013/0305103 A1 | 11/2013 | Carey et al. |
| 2013/0318404 A1 | 11/2013 | Carey et al. |
| 2014/0040673 A1 | 2/2014 | Carey et al. |
| 2014/0047273 A1 | 2/2014 | Carey et al. |
| 2014/0068347 A1 | 3/2014 | Carey et al. |
| 2014/0101307 A1 | 4/2014 | Carey et al. |
| 2014/0172938 A1 | 6/2014 | Carey et al. |
| 2014/0214896 A1 | 7/2014 | Hotta et al. |
| 2015/0033243 A1 | 1/2015 | Carey et al. |
| 2015/0058657 A1 | 2/2015 | Archer et al. |
| 2015/0058676 A1 | 2/2015 | Boger et al. |
| 2015/0074164 A1 | 3/2015 | Boger et al. |
| 2015/0074472 A1 | 3/2015 | Boger et al. |
| 2015/0149630 A1* | 5/2015 | Atkins ............... G06F 11/0709 709/226 |
| 2015/0193295 A1 | 7/2015 | Boger |
| 2015/0195165 A1* | 7/2015 | Boger ............... G06F 11/0787 709/224 |
| 2015/0271124 A1 | 9/2015 | Atkins et al. |
| 2015/0355976 A1 | 12/2015 | Carey et al. |

OTHER PUBLICATIONS

Cottrell, et al., "Distributed Computing Environment Monitoring and User Expectations,", CHEP95 Conference, Sep. 1995, pp. 1-29, SLAC, Rio de Janeiro.

Sundstrom, et al., "SNA: Current Requirements and Direction," IBM Systems Journal, vol. 26, No. 1 1987, pp. 13-36, IBM Communication Products Division, Research Triangle Park, North Carolina USA.

Carey et al., "A Toolkit for Event Analysis and Logging", SC'11, Nov. 12, 2011, pp. 1-7, ACM, Seattle, Washington.

Interlink Software Services, "Business Enterprise Server User Guide", Jun. 20, 2012, pp. 1-506, Version 3.5, Interlink Software Services, Ltd., Manchester, UK.

Sourceforge, "HowTo—Event Analyzer", sourceforge.net (online), Nov. 6, 2012, [accessed Apr. 15, 2013], 4 pages, URL: http://sourceforge.net/apps/mediawiki/pyteal/index.php?title=HowTo_-_Event_Analyzer#Checkpoint_support.

Splunk Inc., "Splunk Hadoop Connect", splunk.com (online), 2 pages, [accessed May 15, 2013], URL: http://www.splunk.com/view/hadoop-connect/SP-CAAAHA3.

Brown, "Using Hadoop to Process a Trillion+ Events", Presentation, Mar. 2012, 29 pp., comScore, Inc., (online), URL: http://www.slideshare.net/Hadoop_Summit/analyzing-14-trillion-events-with-hadoop.

Kimball, "Real-time Streaming Analysis for Hadoop and Flume", Open Source Data Convention (OSCON), Jul. 2011, 24 pp., oscon.com (online), URL: http://cdn.oreillystatic.com/en/assets/1/event/61/Real-time%20Streaming%20Analysis%20for%20Hadoop%20and%20Flume%20Presentation.pdf.

Office Action, U.S. Appl. No. 13/275,487, Feb. 25, 2014, pp. 1-40.
Office Action, U.S. Appl. No. 13/710,523, Mar. 3, 2014, pp. 1-38.
Office Action, U.S. Appl. No. 13/570,819, Apr. 30, 2014, pp. 1-20.
Manku, et al., "Approximate Frequency Counts over Data Streams", Proceedings of the 28th VLDB Conference (28th VLDB), pp. 346-357, Aug. 2002, Morgan Kaufmann, San Francisco, CA.
Final Office Action, U.S. Appl. No. 13/117,371, May 22, 2014, pp. 1-21.
Office Action, U.S. Appl. No. 13/166,470, Jul. 21, 2014, pp. 1-24.
Office Action, U.S. Appl. No. 13/275,530, May 23, 2014, pp. 1-22.
Office Action, U.S. Appl. No. 13/567,601, May 23, 2014, pp. 1-34.
Final Office Action, U.S. Appl. No. 13/688,603, Jun. 26, 2014, pp. 1-17.

* cited by examiner

DETERMINING A NUMBER OF UNIQUE INCIDENTS IN A PLURALITY OF INCIDENTS FOR INCIDENT PROCESSING IN A DISTRIBUTED PROCESSING SYSTEM

CROSS-REFERENCE TO RELATED APPLICATION

This application is a continuation application of and claims priority from U.S. patent application Ser. No. 14/148,829, filed on Jan. 7, 2014.

BACKGROUND OF THE INVENTION

1. Field of the Invention

The field of the invention is data processing, or, more specifically, methods, apparatuses, and computer program products for determining a number of unique incidents in a plurality of incidents for incident processing in a distributed processing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern distributed processing systems for intensive computing may have millions of devices with many processes running on each device all of which are capable of error and status reporting for automated error recovery, reporting to a systems administrator, and for other reasons. In many cases, in the case of an error for example, the sheer number of such error reports and status reports are so overwhelming that they cannot be handled in a meaningful manner. For example, a systems administrator receiving a hundred thousand error reports may be overwhelmed by the sheer number of such reports and therefore in the aggregate those reports become more and more unhelpful and irrelevant.

SUMMARY OF THE INVENTION

Methods, apparatuses, and computer program products for determining a number of unique incidents in a plurality of incidents for incident processing in a distributed processing system are provided. Embodiments include an incident analyzer identifying within the plurality of incidents, attribute combination entries of location identifications and incident types and analyzing each location identification in each attribute combination entry according to a sequence of the attribute combination entries including creating attribute pairs. The incident analyzer is also configured to count the attribute pairs. The number of attribute pairs is the number of unique incidents in the plurality of incidents.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
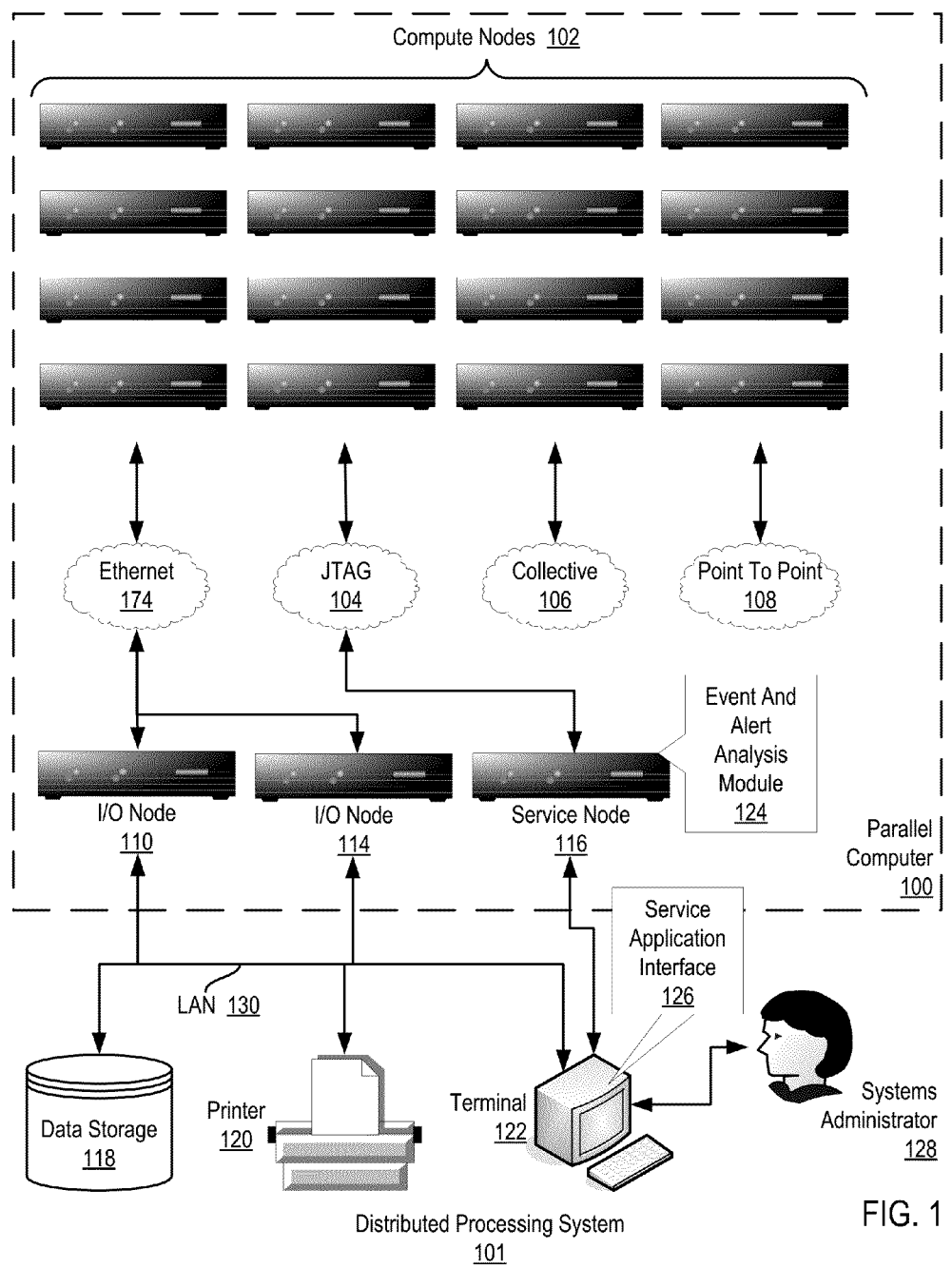
FIG. 1 illustrates an exemplary system for determining a number of unique incidents in a plurality of incidents for incident processing in a distributed processing system according to embodiments of the present invention.

Exemplary methods, apparatuses, and computer program products for determining a number of unique incidents in a plurality of incidents for incident processing in a distributed processing system according to embodiments of the present invention are described with reference to the accompanying drawings, beginning with FIG. 1. FIG. 1 illustrates an exemplary system for determining a number of unique incidents in a plurality of incidents for incident processing in a distributed processing system (101) according to embodiments of the present invention. A distributed processing system is typically implemented as multiple autonomous or semi-autonomous computers that communicate through a computer network. In such example distributed processing systems, the computers often interact with each other in order to achieve a common goal. A computer program that runs in such an example distributed system is typically called a distributed program, and distributed programming is often used to describe the process of writing such programs.

In the example of FIG. 1, the distributed processing system (101) is implemented as a parallel computer (100), non-volatile memory for the computer in the form of data storage device (118), an output device for the computer in the form of a printer (120), and an input/output device for the computer in the form of a computer terminal (122). The parallel computer (100) in the example of FIG. 1 includes a plurality of compute nodes (102). Each compute node is an automated computing device composed of one or more computer processors, its own computer memory, and its own input/output functionality. The compute nodes (102) are coupled for data communications by several independent data communications networks including a high speed Ethernet network (174), a Joint Test Action Group ('JTAG') network (104), a collective or tree network (106) which is optimized for collective operations, and a torus network (108) which is optimized for point to point operations. The tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer (100).

In addition to the compute nodes (102), the parallel computer (100) includes input/output ('I/O') nodes (110, 114) coupled to the compute nodes (102) through the high speed Ethernet network (174). The I/O nodes (110, 114) provide I/O services between the compute nodes (102) and I/O devices, which in this example is the data storage device (118), the printer (120) and the terminal (122). The I/O nodes (110, 114) are connected for data communications through a local area network (IAN') (130). The parallel computer (100) also includes a service node (116) coupled to the compute nodes (102) through the JTAG network (104). The service node (116) provides service common to the compute nodes (102), such as loading programs into the compute nodes (102), starting program execution on the compute nodes (102), retrieving results of program operations on the compute nodes (102), and so on. The service node (116) runs an event and alert analysis module (124) and communicates with a system administrator (128) through a service application interface (126) that runs on the computer terminal (122).

Many of the components of the distributed processing system of FIG. 1, that is the devices of the distributed processing system or processes running on the devices of the distributed processing system of FIG. 1, are capable of some form of error or status reporting through events and many of such components are also capable of receiving alerts in response to one or more of such events. Often in distributed processing systems hundreds of thousands or millions of components may provide or receive incidents, often in the form of events or alerts.

An incident is a generic term used in this specification to mean an identification or notification of a particular occurrence on a component of a distributed processing system such as events described below, a refined identification of an occurrence often based on events such as an alert described below, or other notifications as will occur to those of skill in the art.

Incidents are administered in pools for event and alert analysis according to embodiments of the present invention. A pool of incidents is a collection of incidents organized by the time of either their occurrence, by the time they are logged in an incident queue, included in the pool, or other time as will occur to those of skill in the art. Such incident pools often provide the ability to analyze a group of time related incidents. Often such incident pools are useful in identifying fewer and more relevant incidents in dependence upon multiple related incidents.

An event according to embodiments of the present invention is a notification of a particular occurrence in or on a component of the distributed processing system. Such events are sent from the component upon which the occurrence occurred or another reporting component to an event and alert analysis module according to the present invention. Often events are notifications of errors occurring in a component of the data processing system. Events are often implemented as messages either sent through a data communications network or shared memory. Typical events for event and alert analysis according to embodiments of the present invention include attributes such as an occurred time, a logged time, an event type, an event ID, a reporting component, location information, and a source component, and other attributes.

An alert according to embodiments of the present invention is a refined identification of an occurrence, such as an error, based upon more than one event and therefore provides an identification of the occurrence in the context of its operation in the distributed processing system. Often an alert may be a notification of a particular error type of occurrence that is identified in dependence upon the plurality of events received from one or more components of the data processing system, such as, for example, a link failure among a plurality of devices each of which are producing many events based upon the single link failure, or a power failure provoking thousands of events, and so on.

Alerts are often implemented as messages to be sent through a data communications network or shared memory. Typical alerts according to embodiments of the present invention have attributes attached to them based upon the attributes of the events received from which they are identified.

The event and alert analysis module (124) includes at least two incident analyzers implemented as an event analyzer and an alert analyzer capable of determining a number of unique incidents in a plurality of incidents for incident processing in a distributed processing system according to embodiments of the present invention. The event and alert analysis module (124) is also implemented as a monitor and checkpoint manager for managing the checkpoints from the incident analyzers.

Specifically, the event and alert analysis module (124) is implemented as automated computing machinery configured to identify within a plurality of incidents, attribute combination entries of location identifications and incident types. Each attribute combination entry has one location identification and a set of unique incident types corresponding to the location identification. The event and alert analysis module (124) is also configured to analyze each location identification in each attribute combination entry according to a sequence of the attribute combination entries. For each location identification of each attribute combination entry, the event and alert analysis module (124) is configured to determine whether the set of unique incident types within the attribute combination entry includes an incident type not selected for pairing with another location identification in an attribute pair. If the set of unique incident types includes an incident type not selected for pairing with another location identification in an attribute pair, the event and alert analysis module (124) is configured to select the incident type for pairing with the location identification in an attribute pair and to create an attribute pair of the selected incident type and the location identification. The event and alert analysis module (124) is also configured to count the attribute pairs, where the number of attribute pairs is the number of unique incidents in the plurality of incidents.

The arrangement of nodes, networks, and I/O devices making up the exemplary distributed processing system illustrated in FIG. 1 are for explanation only, not for limitation of the present invention. Distributed data processing systems configured to determine a number of unique incidents in a plurality of incidents for incident processing according to embodiments of the present invention may include additional nodes, networks, devices, and architectures, not shown in FIG. 1, as will occur to those of skill in the art. The parallel computer (100) in the example of FIG. 1 includes sixteen compute nodes (102). Parallel computers configured to determine a number of unique incidents in a plurality of incidents for incident processing according to embodiments of the present invention sometimes include thousands of compute nodes. In addition to Ethernet, JTAG, collective, and point to point, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Determining a number of unique incidents in a plurality of incidents for incident processing in a distributed processing system in accordance with the present invention is generally implemented with computers, that is, with automated computing machinery. In the system of FIG. 1, for example, all the service nodes, I/O nodes, compute nodes, of the parallel computer are implemented to some extent at least as computers. For further explanation, therefore, FIG. 2 sets forth a block diagram of automated computing machinery comprising an exemplary computer (252) useful in determining a number of unique incidents in a plurality of incidents for incident processing in a distributed processing system according to embodiments of the present invention. The computer (252) of FIG. 2 includes at least one computer processor (256) or 'CPU' as well as random access memory (268) (RAM') which is connected through a high speed memory bus (266) and bus adapter (258) to processor (256) and to other components of the computer (252) and through an expansion bus to adapters for communications with other components of a distributed processing system (101).

Stored in RAM (268) is an event and alert analysis module (124), a module of automated computing machinery for determining a number of unique incidents in a plurality of incidents for incident processing in a distributed processing system according to embodiments of the present invention. The event and alert analysis module (124) includes two incident analyzers, a monitor (204), and a checkpoint manager (299) according to embodiments of the present invention.

Figure 2:
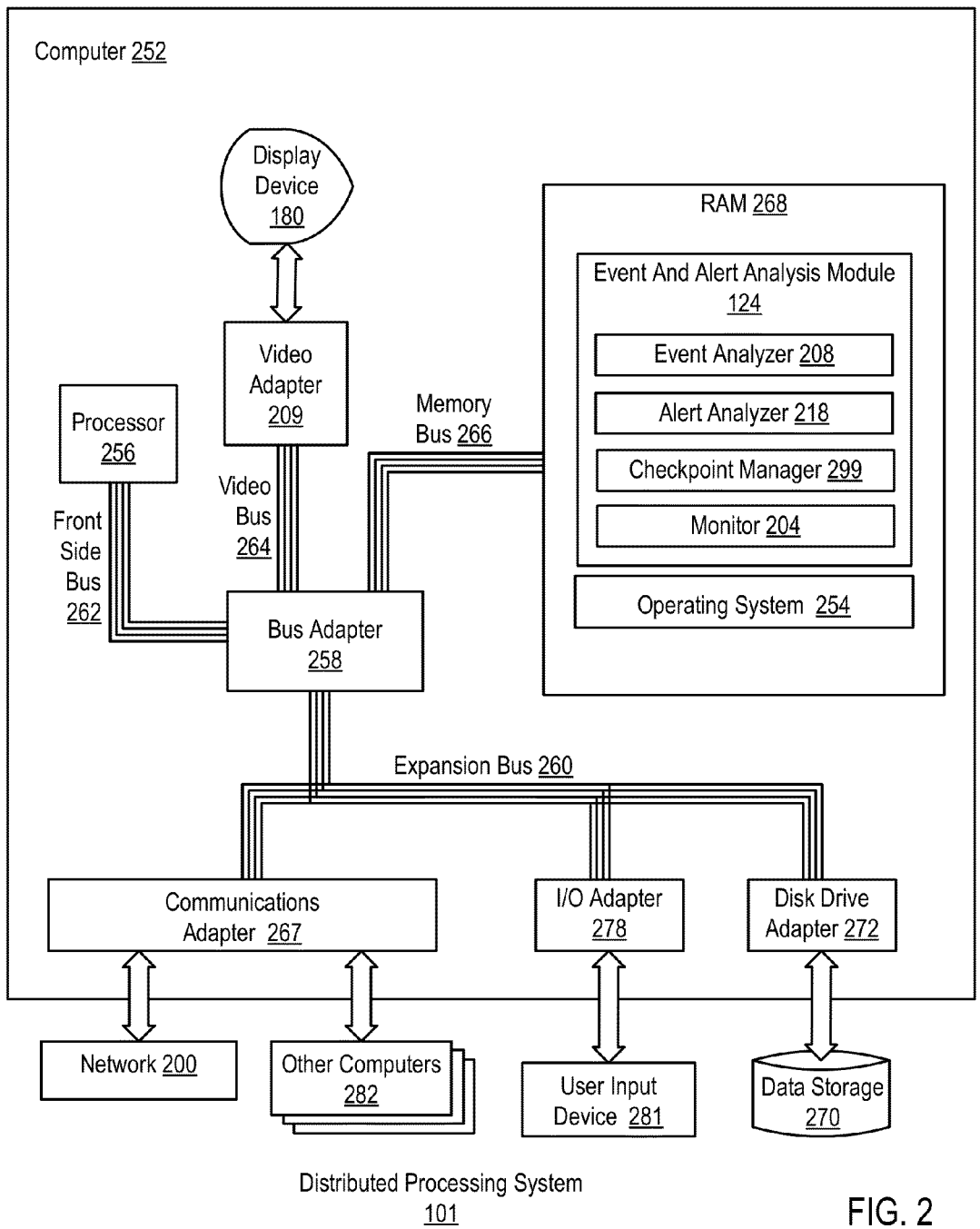
FIG. 2 sets forth a block diagram of automated computing machinery comprising an exemplary computer useful in determining a number of unique incidents in a plurality of incidents for incident processing in a distributed processing system according to embodiments of the present invention.

The checkpoint manager (299) is configured to process checkpoints from the incident analyzers. In the example of FIG. 2, the monitor (204) receives events from components of the distributed processing system and puts the received events in an event queue. The monitor (204) of FIG. 2 may receive events from components of the distributed processing system on their motion, may periodically poll one or more of the components of the distributed processing system, or receive events from components in other ways as will occur to those of skill in the art.

The incident analyzers include an event analyzer (208) and an alert analyzer (218). The event analyzer of FIG. 2 is a module of automated computing machinery capable of identifying alerts in dependence upon received events. That is, event analyzers typically receive events and produce alerts. In many embodiments, event analyzers are implemented in parallel. Often such event analyzers are assigned to a particular pool of events and may be focused on events from a particular component or caused by a particular occurrence to produce a more concise set of alerts.

The alert analyzer (218) of FIG. 2 is a module of automated computing machinery capable of identifying alerts for transmission from events and other alerts, identifying additional alerts for transmission, and suppressing unnecessary, irrelevant, or otherwise unwanted alerts identified by the event analyzer. That is, alert analyzers typically receive alerts and events and produce or forward alerts in dependence upon those alerts and events. In many embodiments, alert analyzers are implemented in parallel. Often such alert analyzers are assigned to a particular pool of alerts and may be focused on alerts with particular attributes to produce a more concise set of alerts.

In addition to the general functions described above, the event and alert analysis module (124) may be configured to determine a number of unique incidents in a plurality of incidents for incident processing in a distributed processing system according to embodiments of the present invention. Specifically, the event and alert analysis module (124) is implemented as automated computing machinery configured to identify within a plurality of incidents, attribute combination entries of location identifications and incident types. Each attribute combination entry has one location identification and a set of unique incident types corresponding to the location identification. The event and alert analysis module (124) is also configured to analyze each location identification in each attribute combination entry according to a sequence of the attribute combination entries. For each location identification of each attribute combination entry, the event and alert analysis module (124) is configured to determine whether the set of unique incident types within the attribute combination entry includes an incident type not selected for pairing with another location identification in an attribute pair. If the set of unique incident types includes an incident type not selected for pairing with another location identification in an attribute pair, the event and alert analysis module (124) is configured to select the incident type for pairing with the location identification in an attribute pair and to create an attribute pair of the selected incident type and the location identification. The event and alert analysis module (124) is also configured to count the attribute pairs, where the number of attribute pairs is the number of unique incidents in the plurality of incidents.

Also stored in RAM (268) is an operating system (254). Operating systems useful for relevant alert delivery according to embodiments of the present invention include UNIX™, Linux™, Microsoft XP™, AIX™, IBM's i5/OS™, and others as will occur to those of skill in the art. The operating system (254), event and alert analysis module (124), the event analyzer (208), the alert analyzer (218) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). The disk drive adapter (272) connects non-volatile data storage to the computer (252) in the form of disk drive (270). Disk drive adapters useful in computers for determining a number of unique incidents in a plurality of incidents for incident processing in a distributed processing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. The video adapter (209) is connected to processor (256) through a high speed video bus (264), bus adapter (258), and the front side bus (262), which is also a high speed bus.

The exemplary computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for determining a number of unique incidents in a plurality of incidents for incident processing in a distributed processing system according to embodiments of the present invention include modems for wired dial-up communications, Ethernet (IEEE 802.3) adapters for wired data communications network communications, and 802.11 adapters for wireless data communications network communications.

Figure 3:
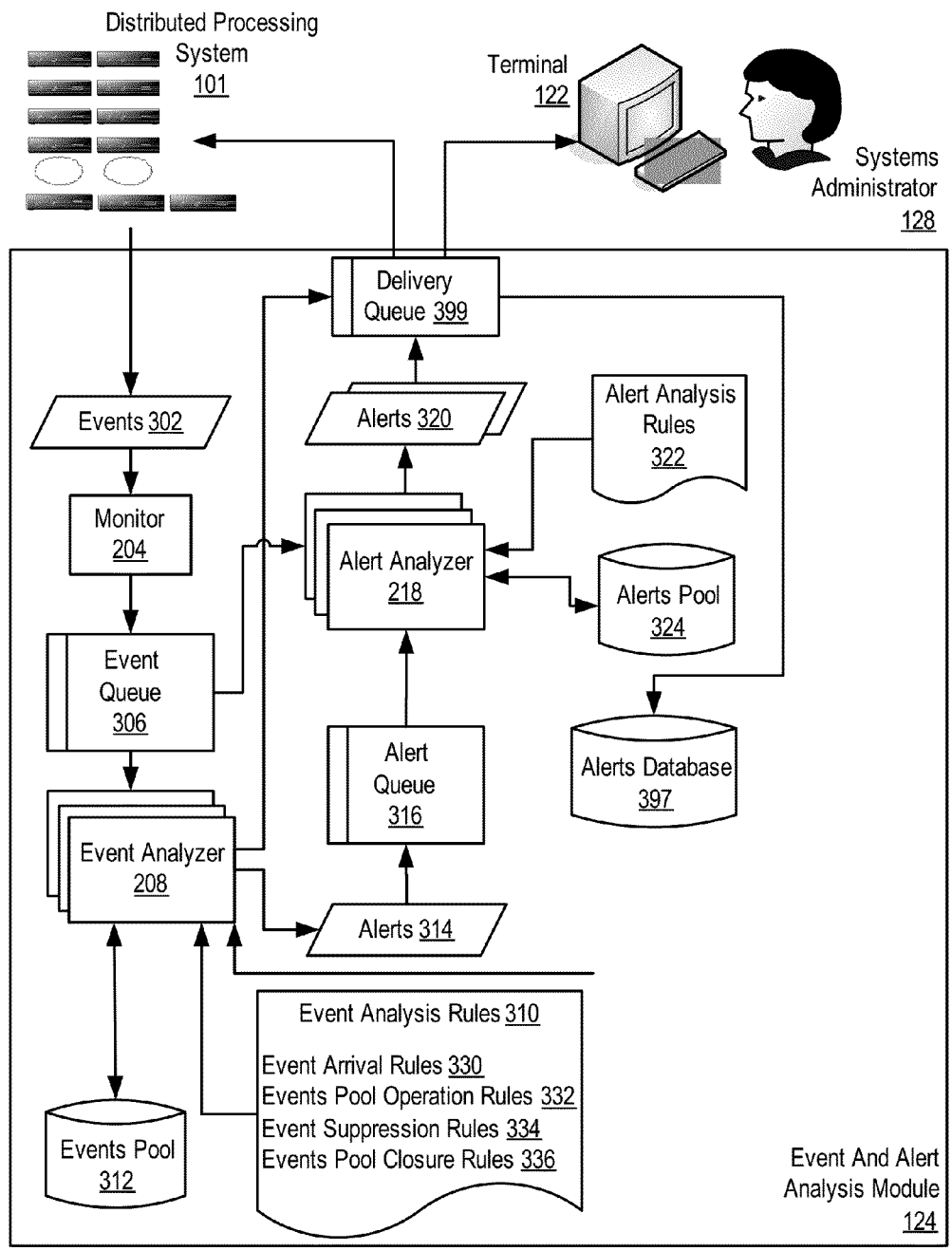
FIG. 3 sets forth a block diagram of an exemplary system for determining a number of unique incidents in a plurality of incidents for incident processing in a distributed processing system according to embodiments of the present invention.

For further explanation, FIG. 3 sets forth a block diagram of an exemplary system for determining a number of unique incidents in a plurality of incidents for incident processing in a distributed processing system (101) according to embodiments of the present invention. The system of FIG. 3 includes an event and alert analysis module (124). The event and alert analysis module (124) of FIG. 3 receives in an event queue (306) a plurality of events (302) from one or more components of a distributed processing system (101). A component of a distributed processing system according to embodiments of the present invention may be a device of the distributed processing system or a process running on a device of the distributed processing. Such components are often capable of some form of event transmission, often for error or status reporting.

An event according to embodiments of the present invention is a notification of a particular occurrence in or on a component of the distributed processing system. Such events are sent from the component upon which the occurrence occurred or another reporting component to an event and alert analysis module according to the present invention. Often events are notifications of errors occurring in a component of the data processing system. Events are often implemented as messages either sent through a data communications network or shared memory. Typical events for event and alert analysis according to embodiments of the present invention include attributes such as an occurred time, a logged time, an event type, an event ID, a reporting component, location, and a source component, and other attributes. An occurred time is the time at which the event occurred on the component. A logged time is the time the event was included in the event queue (306) and is typically inserted into the event by a monitor. An event type is an indication of the type of the event such as for example, power error, link failure error, errors related to not receiving messages or dropping packets and so on as will occur to those of skill in the art. A location could be a node, mode, link, or other part of the system representing where the event occurred. An event ID is a unique identification of the event. A reporting component is an identification of the component that reported the event. A source component is an identification of the component upon which the event occurred. In many cases, but not all, the reporting component and source component are the same component of the distributed processing system.

The event and analysis module (124) of FIG. 3 also includes a checkpoint manager (299) that is configured to process and manage checkpoints for the incident analyzers.

In the example of FIG. 3, the monitor (204) receives events from components of the distributed processing system and puts the received events (302) in the event queue (306). The monitor (204) of FIG. 3 may receive events from components of the distributed processing system on their motion, may periodically poll one or more of the components of the distributed processing system, or receive events from components in other ways as will occur to those of skill in the art.

The system of FIG. 3 also includes an event analyzer (208). The event analyzer (208) of FIG. 3 is a module of automated computing machinery configured to identify alerts in dependence upon received events. That is, event analyzers typically receive events and produce alerts. In many embodiments, multiple event analyzers are implemented in parallel. Often event analyzers are assigned to a particular pool of events and may be focused on events from a particular component or caused by a particular occurrence to produce a more concise set of alerts.

As mentioned above, in some embodiments of the present invention, more than one event analyzer may operate in parallel. As such, each event analyzer may maintain one or more events pools for determining a number of unique events in an events pool according to embodiments of the present invention. Assigning by the event analyzer the events to an events pool may therefore include selecting only events from one or more particular components. In such embodiments, particular components may be selected for a particular events pool to provide events associated with a particular period of time from a particular set of one or more components.

Assigning by the event analyzer the events to an events pool may also be carried out by selecting only events of a particular event type. In such embodiments, particular events may be selected for a particular events pool to provide events associated with a particular period of time from a particular set of event types. The event analyzer (208) in the example of FIG. 3 identifies in dependence upon the event analysis rules (310) and the events assigned to the events pool, one or more alerts (314). Event analysis rules (310) are a collection of predetermined rules for meaningfully parsing received events to identify relevant alerts in dependence upon the events.

The event analysis rules (310) of FIG. 3 include event arrival rules (330), events pool operation rules (332), event suppression rules (334), and events pool closure rules (336). The event arrival rules (330) are configurable predetermined rules for identifying alerts in dependence upon events in real time as those events are assigned to the events pool. That is, the event arrival rules (330) identify alerts in dependence upon events before closing the events pool. Such rules are typically predetermined to identify particular alerts in dependence upon attributes of those events. Event arrival rules may for example dictate identifying a particular predetermined alert for transmission to a systems administrator in dependence upon a particular event type or component type for the event or other attribute of that event. Such rules are flexible and may be tailored to a particular distributed computing system and its functions.

An alert according to embodiments of the present invention is a refined identification of an occurrence, such as an error based upon more than one event, and therefore provides an identification of the occurrence in the context of its operation in the distributed processing system. Often an alert may be a notification of a particular error type of occurrence that is identified in dependence upon the plurality of events received from one or more components of the data processing system, such as, for example, a link failure among a plurality of devices each of which are producing many events based upon the single link failure, or a power failure provoking thousands of events, and so on.

Alerts are often implemented as messages to be sent through a data communications network or shared memory. Typical alerts according to embodiments of the present invention have attributes attached to them based upon the attributes of the events received from which they are identified.

The events pool operation rules (332) are configurable predetermined rules for controlling the operations of the events pool. Such rules includes rules identifying the initial predetermined period of time for each events pool, rules dictating the length of time extended to the pool upon the assignment of each new event to the pool, rules dictating the minimum time an event must be in a pool before that event is included in a collection of events when the pool is closed, rules dictating the amount to extend the initial predetermined period of time based on an arrival rate of events assigned to an events pool, rules governing the closing of an events pool, and others as will occur to those of skill in the art. Such rules are flexible and may be tailored to a particular distributed computing system and its functions.

The event suppression rules (334) are configurable predetermined rules for suppressing one or more events in a closed pool of events used in identifying alerts. That is, often events in the closed events pool may be duplicate events, redundant events, or otherwise unnecessary or unhelpful events in identifying alerts. Such suppression rules are typically predetermined to delete, drop, or otherwise ignore those suppressed events. Event suppression rules may for example dictate that more than a threshold number of events of a particular event type or component type are to be suppressed. Such rules are also flexible and may be tailored to a particular distributed computing system and its functions.

The events pool closure rules (336) are configurable predetermined rules for identifying alerts in dependence upon unsuppressed events in the closed events pool and alerts identified by the event arrival rules. That is, events pool closure rules identify new alerts in dependence upon one or more or even all of the unsuppressed events in the closed events pool. The events pool closure rules also identify alerts in dependence upon the alerts identified by the event arrival rules (330) or a combination of the alerts identified by the event arrival rules (330) and one or more of the unsuppressed events in the closed events pool.

The event analyzer (208) in the example of FIG. 3 sends all the alerts (314) identified by the event analyzer (208) to an alert analyzer (218). The alert analyzer of FIG. 3 is a module of automated computing machinery capable of identifying alerts for transmission from events and other alerts, identifying additional alerts for transmission, and suppressing unnecessary, irrelevant, or otherwise unwanted or unhelpful alerts identified by the event analyzer. That is, alert analyzers typically receive alerts and events and produce or forward alerts in dependence upon those alerts and events. In many embodiments, alert analyzers are implemented in parallel. The alerts (316) in the example of FIG. 3 are sent from the event analyzer (208) to the alert analyzer (218) through an alerts queue (316).

The alert analyzer (218) of FIG. 3 assigns each of the identified alerts (314) to an alerts pool (324). An alerts pool is a collection of alerts organized by the time of one or more the events causing the alert to be identified, the time the alert is identified, or other time as will occur to those of skill in the art. That is, alerts pools are a collection of alerts organized by time. Such alerts pools often provide the ability to analyze groups alerts identified and included in the alerts pool according to some time. Often such alerts pools are useful in identifying fewer and more relevant alerts in dependence upon multiple related events and multiple related alerts.

The alert analyzer (218) of FIG. 3 determines in dependence upon alert analysis rules (322) and the alerts in the alerts pool whether to suppress any alerts. Suppressing an alert is typically carried out by dropping the alert, deleting the alert or otherwise ignoring or not transmitting the suppressed alert to a component of the distributed processing system.

The alert analysis rules (322) are a collection of rules for suppressing one or more alerts to provide a more relevant set of alerts for transmission to a component of the distributed processing system, such as for example, for display to a systems administrator and to identify additional alerts for transmission to one or more components of the distributed processing system. Alert analysis rules for example may dictate that duplicate alerts are to be suppressed, alerts of a particular type for transmission to a particular component are to be suppressed, alerts of a particular type be transmitted to a particular component are to be suppressed and so on as will occur to those of skill in the art. Such alerts may be more meaningful to a component of the distributed processing system for automated error recovery or for a systems administrator who may otherwise be less informed by a number of raw unanalyzed alerts.

The alert analyzer (218) of FIG. 3 also has access to the events queue (306). The alert analyzer (218) of FIG. 3 in dependence upon the alert analysis rules may, in some embodiments select events from the events queue and determine whether to suppress any alerts in dependence upon the selected events. That is, alert analysis rules may also take into account events and their attributes for suppressing alerts and for identifying additional alerts for transmission to one or more components. Such events may be related to the alerts in the alerts pool or independent from such alerts.

The alert analyzer (218) of FIG. 3 transmits the unsuppressed alerts to one or more components of the distributed processing system. The alert analyzer may transmit the unsuppressed alerts to one or more components of the distributed processing system by sending the alert as a message across a data communications network, through shared memory, or in other ways as will occur to those of skill in the art. In the example of FIG. 3, the unsuppressed alerts (320) are transmitted to the terminal (122) for display to the systems administrator (128).

The alert analyzer (218) of FIG. 3 is also configured to identify in dependence upon alert analysis rules (322), the alerts in the alerts pool (324), and selected events (306) one or more additional alerts and transmitting the additional alerts to one or more components of the distributed processing system. The additional alerts may include one or more alerts not identified by the event analyzer. Such additional alerts may provide additional information to a component of the distributed processing system of a systems administrator.

In the system of FIG. 3, events (302) are received and analyzed by event analyzers (208) with event analysis rules (310). Based on the event analysis rules (310), the event analyzers (208) generate the alerts (314). These alerts may be sent to a delivery queue (399) for immediate delivery to the system administrator (128) and the distributed processing system (101). These alerts may also be sent to alert analyzers (218) for further processing and generation of additional alerts (320), which may also be provided to the delivery queue (399). The event and alert analysis module (124) also includes an alert database (397) for recording alerts that have generated by the event and alert analysis module (124).

In the example of FIG. 3, the event analyzer (208) is also configured to determine a number of unique events in a plurality of events for event processing. Specifically, the event analyzer (208) is configured to identify within a plurality of events, attribute combination entries of location identifications and event types. Each attribute combination entry has one location identification and a set of unique event types corresponding to the location identification. The event analyzer (208) is also configured to analyze each location identification in each attribute combination entry according to a sequence of the attribute combination entries. For each location identification of each attribute combination entry, the event analyzer (208) is configured to determine whether the set of unique event types within the attribute combination entry includes an event type not selected for pairing with another location identification in an attribute pair. If the set of unique event types includes an event type not selected for pairing with another location identification in an attribute pair, the event analyzer (208) is configured to select the event type for pairing with the location identification in an attribute pair and to create an attribute pair of the selected event type and the location identification. The event analyzer is also configured to count the attribute pairs, where the number of attribute pairs is the number of unique events in the plurality of events.

In the example of FIG. 3, the alert analyzer (218) is also configured to determine a number of unique alerts in a plurality of alerts for alert processing. Specifically, the alert analyzer (218) is configured to identify within a plurality of alerts, attribute combination entries of location identifications and alert types. Each attribute combination entry has one location identification and a set of unique alert types corresponding to the location identification. The alert analyzer (218) is also configured to analyze each location identification in each attribute combination entry according to a sequence of the attribute combination entries. For each location identification of each attribute combination entry, the alert analyzer (218) is configured to determine whether the set of unique alert types within the attribute combination entry includes an alert type not selected for pairing with another location identification in an attribute pair. If the set of unique alert types includes an alert type not selected for pairing with another location identification in an attribute pair, the alert analyzer (218) is configured to select the alert type for pairing with the location identification in an attribute pair and to create an attribute pair of the selected alert type and the location identification. The alert analyzer is also configured to count the attribute pairs, where the number of attribute pairs is the number of unique alerts in the plurality of alerts. Readers of skill in the art, will also realize that other attributes, such as attributes of an alert, may be utilized by the alert analyzer to determine the number of unique alerts in a plurality of alerts.

As mentioned above, determining a number of unique incidents in a plurality of incidents for incident processing in a distributed processing system according to embodiments of the present invention may include assigning events to an events pool and those pools are administered according to embodiments of the present invention. For further explanation, FIG. 4 sets forth a diagram illustrating assigning events to an events pool according to embodiments of the present invention. An events pool (312) is a collection of events organized by the time of either their occurrence, by the time they are logged in the event queue, included in the events pool, or other time as will occur to those of skill in the art. That is, events pools are a collection of events organized by time. Such events pools often provide the ability to analyze a group of time related events and to identify alerts in dependence upon them. Often such events pools are useful in identifying fewer and more relevant alerts in dependence upon multiple related events.

Events pools according to embodiments of the present invention are typically operated according to events pool operation rules which are themselves often included in event analysis rules. Such events pool operation rules are configurable predetermined rules for controlling the operations of the events pool. Such rules includes rules identifying the initial predetermined period of time for each events pool, rules dictating the length of time extended to the pool upon the assignment of each new event to the pool, rules dictating the minimum time an event must be in a pool before that event is included in a collection of events when the pool is closed, rules dictating the amount to extend the initial predetermined period of time based on an arrival rate of events assigned to an events pool, rules governing the closing of an events pool, and others as will occur to those of skill in the art. Such rules are flexible and may be tailored to a particular distributed computing system and its functions.

Figure 4:
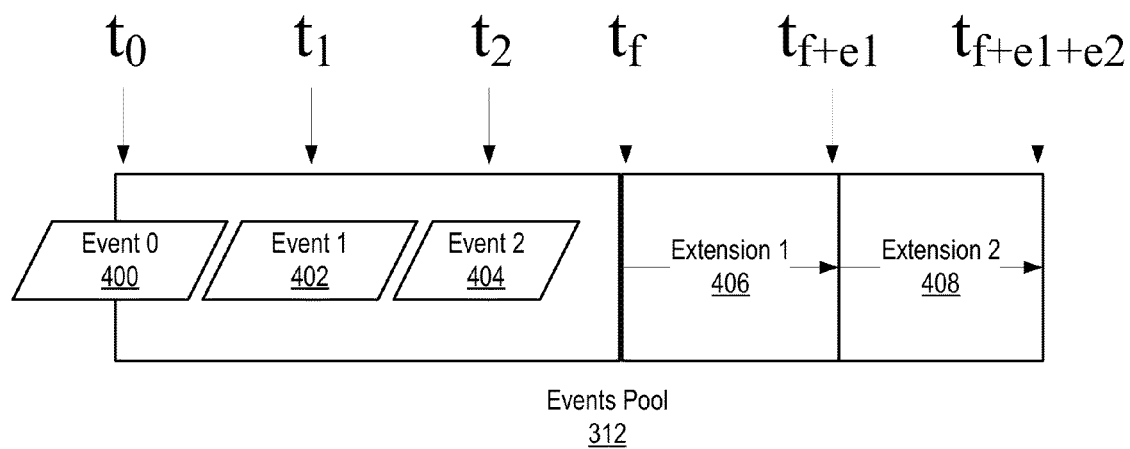
FIG. 4 sets forth a diagram illustrating assigning events to an events pool according to embodiments of the present invention.

Events are often assigned to an events pool according to their logged time. That is, events are typically inserted into the events pool in the order that they are received in the event queue. In the example of FIG. 4, the timing of the events pool (312) is initiated when the first event 'Event 0' (400) is assigned to the events pool (312) at time $t_0$. The events pool of FIG. 4 is initiated for a predetermined initial period of time from $t_1$ to $t_f$. That is, upon receiving the first event 'Event 0' (400) the events pool of FIG. 4 has a predetermined initial period of time beginning at $t_1$ and ending at $t_f$. The predetermined initial period of time may be configured in dependence upon a number of factors as will occur to those of skill in the art such as, the number of components in the distributed processing system, the frequency of receiving events, the types of events typically received and so on as will occur to those of skill in the art.

In the example FIG. 4, the initial period of time is extended for each new event assigned to the events pool during the predetermined initial period from $t_1$ to $t_f$ by a particular period of time assigned to the event. In the example of FIG. 4 upon assigning 'Event 1' (402) to the events pool (312) the predetermined initial period of time $t_0$-$t_f$ is extended by 'Extension 1' (406) having a time of e1 thereby creating a new time for closing the events pool (312) at $t_{f+e1}$ if no other events are assigned to the pool before $t_{f+e1}$. Similarly, in the example of FIG. 4 upon assigning 'Event 2' (404) to the events pool having a time of e2, the now extended period of time from $t_0$-$t_{f+e1}$ is extended again by extension 2 (406) thereby establishing a new time for closing the pool at time $t_{f+e1+e2}$ if no other events are assigned to the pool before $t_{f+e1+e2}$ or before some maximum time for the events pool has expired. In this manner, the events pool is extended with each received event until a collection of events that may be usefully used to identify alerts is assigned to the events pool. According to embodiments of the present invention, the predetermined initial period of time may be extended based on an arrival rate at which events are assigned to an events pool.

In typical embodiments of the present invention, events pools may have a maximum duration that can no longer be extended. In such cases, a requirement may exist that an event that has not resided in the events pool for a threshold period of time be moved to a next events pool. In some embodiments, the attributes of such an event that is moved to the next events pool are used for relevant alert delivery with the initial events pool and in other embodiments; the attributes of such an event are used for relevant alert delivery with the next events pool to which that event is moved.

In the example of FIG. 4, when conditions are met to close the pool an events analyzer determines for each event (400, 402, 404) in the events pool (312) whether the event has been in the pool for its predetermined minimum time for inclusion in a pool. If the event has been in the pool for its predetermined minimum time, the event is included in the closed pool for event analysis for relevant alert delivery. If the event has not been in the pool for its predetermined minimum time, the event is evicted from the closed pool and included a next pool for event analysis for relevant alert delivery.

In many embodiments, a plurality of events pools may be used in parallel and one or more of such events pools are assigned to a particular events analyzer. In such embodiments, events analyzers may be directed to events in events pools having particular attributes.

Figure 5:
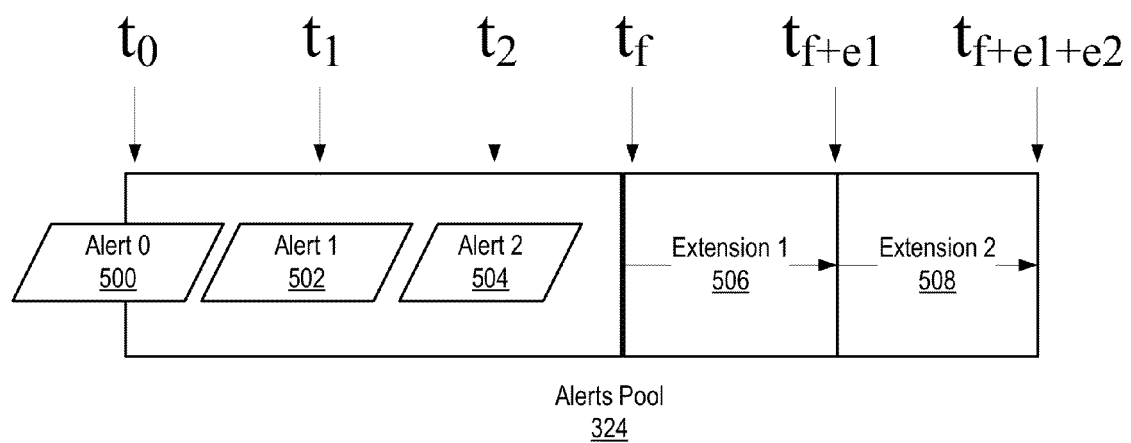
FIG. 5 sets forth a diagram illustrating assigning alerts to an alerts pool according to embodiments of the present invention.

As mentioned above, determining a number of unique incidents in a plurality of incidents for incident processing in a distributed processing system according to embodiments of the present invention may include assigning alerts to an alerts pool and those pools are administered according to embodiments of the present invention. For further explanation, FIG. 5 sets forth a diagram illustrating assigning alerts to an alerts pool according to embodiments of the present invention. The alerts pool (324) of FIG. 5 operates in a manner similar to the events pool of FIG. 4. That is, the alerts pool according to the example of FIG. 5 includes alerts and the timing of the alerts pool begins with the first alert 'Alert 0' (500) at time $t_0$ and is configured to have a predetermined initial period of time $t_0$-tf. In the example of FIG. 5, the initial period of time is extended for each new alert assigned to the alerts pool in the predetermined initial period from $t_1$ to $t_f$ by a particular period of time assigned to the alert. In the example of FIG. 5, upon assigning 'Alert 1' (502) to the alerts pool (324) the predetermined initial period of time $t_0$-$t_f$ is extended by 'Extension 1' (506) having a time of e1 thereby creating a new time for closing the alerts pool (324) at $t_{f+e1}$ if no other alerts are assigned to the pool before $t_{f+e1}$. Similarly, in the example of FIG. 5 upon assigning 'Alert 2' (504) to the alerts pool having a time of e2, the now extended period of time from $t_0$-$t_{f+e1}$ is extended again by 'Extension 2' (506) thereby establishing a new time for closing the pool at time $t_{f+e1+e2}$ if no other alerts are assigned to the pool before $t_{f+e1+e2}$ or before some maximum time for the alerts pool has expired. According to embodiments of the present invention, the predetermined initial period of time may be extended based on an arrival rate at which alerts are assigned to an alerts pool.

In typical embodiments of the present invention, alerts pools may have a maximum duration that can no longer be extended. In such cases, a requirement may exist that an alert that has not resided in the alerts pool for a threshold period of time be moved to a next alerts pool. In some embodiments, the attributes of such an alert that is moved to the next alerts pool are used for relevant alert delivery according to embodiments of the present invention with the initial alerts pool and in other embodiments, the attributes of such an alert are used for relevant alert delivery with the next alerts pool to which that alert is moved.

In the example of FIG. 5, when conditions are met to close the pool an alerts analyzer determines for each alert (500, 502, 504) in the pool (324) whether the alert has been in the pool for its predetermined minimum time for inclusion in a pool. If the alert has been in the pool for its predetermined minimum time, the alert is included in the closed pool for alert analysis for relevant alert delivery according to embodiments of the present invention. If the alert has not been in the pool for its predetermined minimum time, the alert is evicted from the closed pool and included a next pool for alert analysis for relevant alert delivery according to embodiments of the present invention.

In many embodiments, a plurality of alerts pools may be used in parallel and one or more of such alerts pools are assigned to a particular alerts analyzer. In such embodiments, alerts analyzers may be directed to alerts in alerts pools having particular attributes.

As mentioned above, determining a number of unique incidents in a plurality of incidents for incident processing in a distributed processing system according to embodiments of the present invention may include the administration of one or more pools of incidents such as events, alerts or other incidents as will occur to those of skill in the art. For further explanation, FIG. 6 sets forth a flow chart illustrating an example method of administering incident pools for incident processing in a distributed processing system according to embodiments of the present invention.

Figure 6:
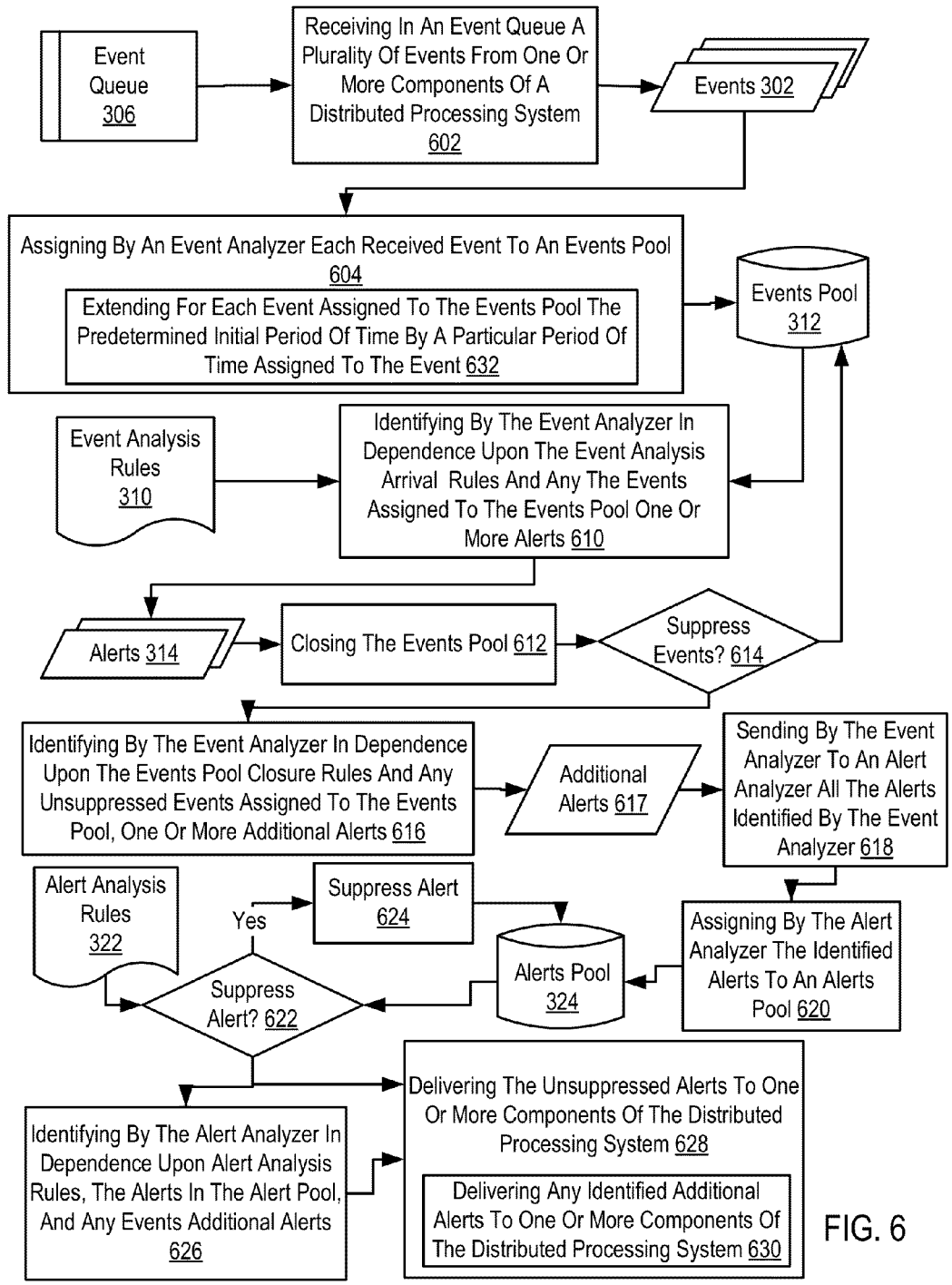
FIG. 6 sets forth a flow chart illustrating an example method of administering incident pools for incident processing in a distributed processing system according to embodiments of the present invention.

The method of FIG. 6 includes receiving (602) in an event queue a plurality of events (302) from one or more components of a distributed processing system. Attributes of events useful in determining a number of unique events in an events pool for incident analysis in a distributed processing system according to embodiments of the present invention may include an occurred time, a logged time, an event type, an event ID, a reporting component, a location, and a source component.

Receiving (602) in an event queue a plurality of events (302) from one or more components of a distributed processing system may be carried out by receiving an event initiated by one or more components of the data processing system and storing the event in the event queue according to the time in which the event occurred or according to the time the event was received. Receiving (602) in an event queue a plurality of events (302) from one or more components of a distributed processing system also may be carried out by polling a component for status and receiving in response an event and storing the event in the event queue according to the time in which the event occurred or according to the time the event was received.

The method of FIG. 6 also includes assigning (604) by an event analyzer each received event to an events pool (312). In some embodiments of the present invention, assigning (604) by an event analyzer each received event (302) to an events pool (312) may be carried out by assigning events to the events pool according to the logged time. Assigning (604) by an event analyzer each received event (302) to an events pool (312) may also be carried out in dependence upon attributes of the event. Such attributes may include an identification or type of the component upon which an occurrence occurred to create the event, the reporting component of the event, the event ID, the event type, and so on as will occur to those of skill in the art.

An events pool according to the method of FIG. 6 includes events occurring during a predetermined initial period of time and in the example of FIG. 6 assigning (604) by the event analyzer each received event to an events pool includes extending (626) for each event assigned to the events pool the predetermined initial period of time by a particular period of time assigned to the event.

The event analyzer includes event analysis rules (310) including, event arrival rules, events pool operation rules, event suppression rules, and events pool closure rules. Event arrival rules are configurable predetermined rules for identifying alerts in dependence upon events in real time as those events are assigned to the events pool. That is, event arrival rules identify alerts in dependence upon events before closing the events pool. Such rules are flexible and may be tailored to a particular distributed computing system and its functions.

An alert according to embodiments of the present invention is a refined identification of an occurrence, such as an error based upon more than one event, and therefore provides an identification of the occurrence in the context of its operation in the distributed processing system. Often an alert may be a notification of a particular error type of occurrence that is identified in dependence upon the plurality of events received from one or more components of the data processing system, such as, for example, a link failure among a plurality of devices each of which are producing many events based upon the single link failure, or a power failure provoking thousands of events, and so on.

Alerts are often implemented as messages to be sent through a data communications network or shared memory. Typical alerts according to embodiments of the present invention have attributes attached to them based upon the attributes of the events received from which they are identified.

Events pool operation rules are configurable predetermined rules for controlling the operations of the events pool. Such rules includes rules identifying the initial predetermined period of time for each events pool, rules dictating the length of time extended to the pool upon the assignment of each new event to the pool, rules dictating the minimum time an event must be in a pool before that event is included in a collection of events when the pool is closed, rules governing the closing of an events pool, and others as will occur to those of skill in the art. Such rules are flexible and may be tailored to a particular distributed computing system and its functions.

Event suppression rules are configurable predetermined rules for suppressing one or more events in a closed pool of events used in identifying alerts. That is, often events in the closed events pool may be duplicate events, redundant events, or otherwise unnecessary or unhelpful events in identifying alerts. Such suppression rules are typically predetermined to delete, drop, or otherwise ignore those suppressed events. Event suppression rules may for example dictate that more than a threshold number of events of a particular event type or component type are to be suppressed. Such rules are also flexible and may be tailored to a particular distributed computing system and its functions.

Events pool closure rules are configurable predetermined rules for identifying alerts in dependence upon unsuppressed events in the closed events pool and alerts identified by the event arrival rules. That is, events pool closure rules identify new alerts in dependence upon one or more or even all of the unsuppressed events in the closed events pool. The events pool closure rules also identify alerts in dependence upon the alerts identified by the event arrival rules or a combination of the alerts identified by the event arrival rules and one or more of the unsuppressed events in the closed events pool.

The method of FIG. 6 also includes identifying (610) by the event analyzer in dependence upon the event arrival rules and the events assigned to the events pool one or more alerts (314). Identifying (610) by the event analyzer in dependence upon the event arrival rules and the events assigned to the events pool one or more alerts (314) may be carried out by identifying alerts in dependence upon one or more attributes of the events as that event is assigned to the events pool. Identifying (610) by the event analyzer in dependence upon the event arrival rules and the events assigned to the events pool one or more alerts (314) may be carried by comparing the attributes of the events to the event arrival rules and identifying as a result of the comparison one or more alerts. Such attributes may include the type of component from which the event was received, the type of component creating the event, the identification of the component creating the event, the time the event was created or received, an error reported in the event, and many others as will occur to those of skill in the art.

The method of FIG. 6 also includes closing (612), by the event analyzer in dependence upon the events pool operation rules, the events pool (312). Closing (612), by the event analyzer in dependence upon the events pool operation rules, the events pool (312) may be carried out by determining that conditions dictated by the events pool operation rules have been met to stop assigning new events to the events pool and identifying in dependence upon those events pool operation rules the particular events that are included in the closed pool of events.

Closing the events pool may be carried out by determining that the initial period of time for the events pool and any particular periods of time for events received in the events pool extended to the initial period of time have expired. In such cases, if no new events are received prior to the expiration of the initial period of time for the events pool and any particular periods of time for events received in the events pool extended to the initial period of time the pool is closed.

Closing the events pool may also be carried out by determining that a maximum duration for the events pool has expired. In such cases, regardless of the number of new events being received after a maximum duration for the events pool has expired, the pool is closed. In such embodiments, a maximum duration for the events pool prevents the events pool from including more events than are useful for relevant alert delivery according to embodiments of the present invention.

The method of FIG. 6 also includes determining (614), by the events analyzer in dependence upon the event suppression rules, whether to suppress one or more events in the closed events pool (312). Determining (614), by the events analyzer in dependence upon the event suppression rules, whether to suppress one or more events in the closed events pool (312) may be carried out by determining in dependence upon the attributes of one or more events in the closed pool whether to delete, drop, or otherwise ignore one or more of the events in the closed pool.

The method of FIG. 6 includes identifying (616) by the event analyzer in dependence upon the events pool closure rules and any unsuppressed events assigned to the events pool, one or more additional alerts (617). Identifying (616) by the event analyzer in dependence upon the events pool closure rules and any unsuppressed events assigned to the events pool, one or more additional alerts (617) may be carried out by identifying alerts in dependence upon one or more attributes of the events as that event is assigned to the events pool. Identifying (616) by the event analyzer in dependence upon the events pool closure rules and any unsuppressed events assigned to the events pool, one or more additional alerts (617) may be carried out by selecting the unsuppressed events for the events pool, comparing the attributes of the unsuppressed events of the events pool to the pool closure rules, and identifying as a result of the comparison one or more additional alerts. Such attributes may include the type of component from which one or more of the unsuppressed events are received, the type of components creating the unsuppressed events, the identification of the component creating the unsuppressed events, the time the events were created or received, one or more errors reported by the events event, the number of events in the pool, and many others as will occur to those of skill in the art.

The method of FIG. 6 includes sending (618) by the event analyzer to an alert analyzer all the alerts identified by the event analyzer. Sending (618) by the event analyzer to an alert analyzer all the alerts (314) identified by the event analyzer may be carried out by sending a message containing the alerts from the event analyzer to the alert analyzer. Such a message may be sent from the event analyzer to the alert analyzer across a network, through shared memory, or in other ways as will occur to those of skill in the art.

The method of FIG. 6 includes assigning (620) by the alert analyzer the identified alerts to an alerts pool (324). An alerts pool according to the method of FIG. 6 has a predetermined initial period of time and in the example of FIG. 6 assigning (620) by the alert analyzer the identified alerts to an alerts pool (324) includes extending for each alert assigned to the alerts pool the predetermined initial period of time by a particular period of time assigned to the alert. Assigning (620) by the alert analyzer the identified alerts to an alerts pool (324) also may be carried out in dependence upon attributes of the alerts. Such attributes may include an identification or type of the component upon which an occurrence occurred to create the event that was used to identify the alert, the alert ID, the alert type, and so on as will occur to those of skill in the art.

The method of FIG. 6 includes determining (622) by the alert analyzer in dependence upon alert analysis rules (322) and the alerts in the alerts pool whether to suppress any alerts. Determining (622) by the alert analyzer in dependence upon alert analysis rules (322) and the alerts in the alerts pool whether to suppress any alerts may be carried out in dependence upon one or more attributes of the alerts. Such attributes may include an identification or type of the component upon which an occurrence occurred to create the event that was used to identify the alert, the alert ID, the alert type, and so on as will occur to those of skill in the art. In such embodiments, determining (622) by the alert analyzer in dependence upon alert analysis rules (322) and the alerts in the alerts pool whether to suppress any alerts may be carried out by comparing the attributes of the alerts in the alerts pool to the alert analysis rules and identifying as a result of the comparison one or more alerts for suppression according to the event analysis rules.

The method of FIG. 6 includes delivering (628) the unsuppressed alerts to one or more components of the distributed processing system. Delivering (628) the unsuppressed alerts to one or more components of the distributed processing system may be carried out by sending a message containing the alert to one or more components of the distributed processing system. In many cases, an alert may be sent as a message to a systems administrator advising the systems administrator of one or more occurrences within the distributed processing system.

As mentioned above, alert analysis rules may select additional alerts or suppress alerts in dependence upon events. In such embodiments, determining whether to suppress any alerts includes selecting events and determining whether to suppress any alerts in dependence upon the selected events. The method of FIG. 6 therefore also includes identifying (626) by the alert analyzer in dependence upon alert analysis rules (322), the alerts in the alerts pool (324), and any selected events one or more additional alerts and in the method of FIG. 6, delivering (628) the unsuppressed alerts also includes delivering (630) any additional alerts to one or more components of the distributed processing system.

Figure 7:
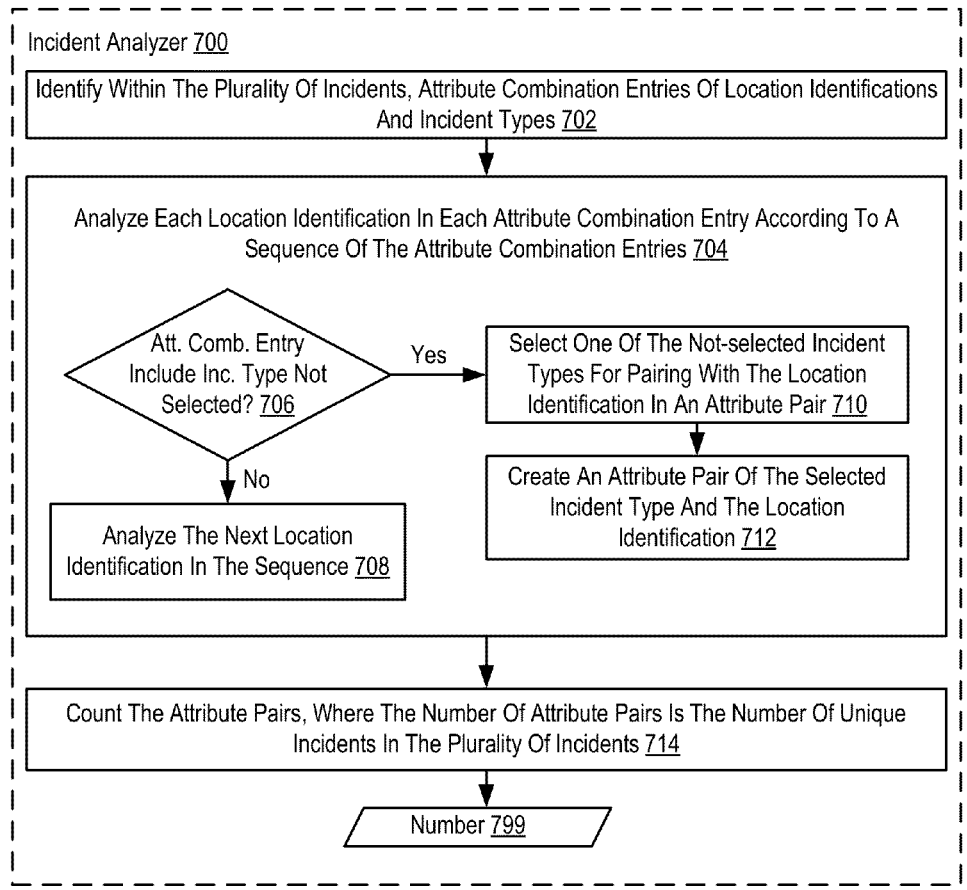
FIG. 7 sets forth a flow chart illustrating an additional method of determining a number of unique incidents in a plurality of incidents for incident processing in a distributed processing system according to embodiments of the present invention.
Figure 7:
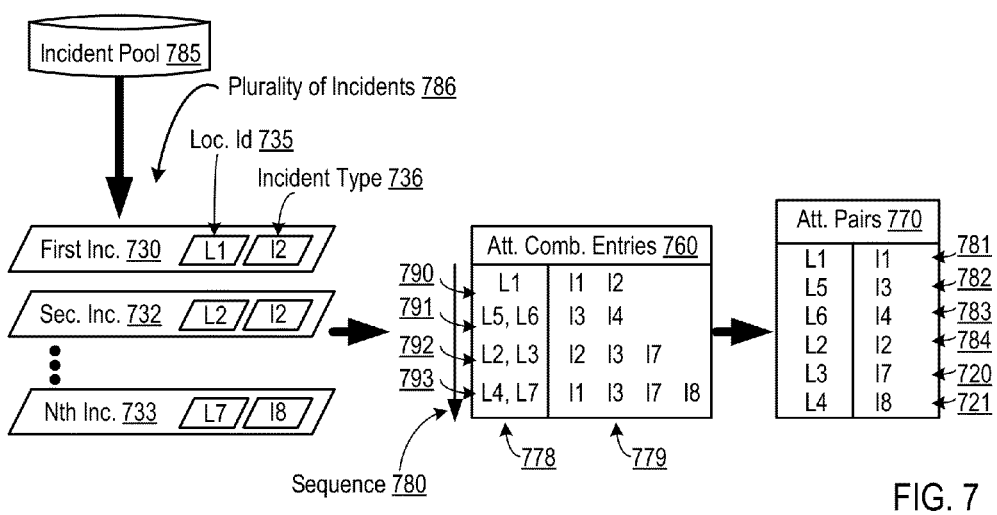

For further explanation, FIG. 7 sets forth a flow chart illustrating an exemplary method of determining a number of unique incidents in a plurality of incidents for incident processing in a distributed processing system according to embodiments of the present invention.

An incident is a generic term used in this specification to mean an identification or notification of a particular occurrence on a component of a distributed processing system such as events, a refined identification of an occurrence often based on events such as an alert, or other notifications as will occur to those of skill in the art.

In the example of FIG. 7, an incidents pool (785) includes a plurality (786) of 'N' number of incidents. For ease of explanation, only a first incident (730), a second incident (732), and an Nth incident (733) are illustrated. Each incident has a corresponding location identification and an incident type. A location identification may be any identifying location associated with the incident, such as a designation of where an incident represented by the incident originated from within the distributed computing system (e.g., a node, a module, or a link). An incident type is an indication of the type of the incident such as for example, power error, link failure error, errors related to not receiving messages or dropping packets and so on as will occur to those of skill in the art. For example, the first incident (730) has a location identification (735) of 'L1' and an incident type (736) of 'I2'.

The method of FIG. 7 includes an incident analyzer (700) identifying (702) within the plurality of incidents (786), attribute combination entries (760) of location identifications and incident types. Each attribute combination entry (760) has at least one location identification (778) and a set (779) of unique incident types corresponding to the at least one location identification (778). That is, the attribute combination entries are keyed to the location identification and have values that are the set of unique incident types associated with that location identification. For example, in FIG. 7, the attribute combination entries (760) include a first pair (790) having a location identification of 'L1' and a set of incident types that include 'I1' and 'I2'. The attribute combination entries (760) also include a second pair (791) having a location identification of 'L5' and 'L6' and a set of incident types that include 'I3' and 'I4'. In the second pair (791), the 'L5' location identification and the 'L6' location identification had an identical set of incident types and were therefore merged together in the attribute combination entry to compact and reduce the size of the attribute combination entries (760). The third pair (792) includes the 'L2' location identification and 'L3' location identification, both having the identical set of incident types that includes 'I2', 'I3', and 'I7'. The fourth pair (793) includes the 'L4' location identification and the 'L7' location identification and the identical set of incident types that includes 'I1', 'I3', 'I7', and 'I8'. As will be explained in FIG. 10, in other embodiments of the invention, the location identifications having identical sets of incident types may initially not be merged or may not be merged all at, in which case the location identifications are placed in separate attribute combination entries.

The method of FIG. 7 also includes the incident analyzer (700) analyzing (704) each location identification (778) in each attribute combination entry (760) according to a sequence (780) of the attribute combination entries. A sequence is the order that the location identifications or the attribute combination entries are analyzed. In the example of FIG. 7, the sequence (780) start with the location identifications in the first pair (790), and proceeds to the second pair (791), to the third pair (792), and ends with the fourth pair (793). As will be explained in greater detail in FIG. 8, the particular sequence that the location identifications and attribute combination entries are processed may impact the analysis of the attribute combination entries and ultimately the number of attribute pairs and the determination of the number of unique incidents in the plurality of incidents.

Analyzing (704) each location identification (778) in each attribute combination entry (760) according to the sequence (780) of the attribute combination entries includes for each location identification of each attribute combination entry: determining (706) whether the set of unique incident types within the attribute combination entry includes an incident type not selected for pairing with another location identification in an attribute pair (770). Determining (706) whether the set of unique incident types within the attribute combination entry includes an incident type not selected for pairing with another location identification in an attribute pair (770) may be carried out by storing within a data structure, an incident type that is selected for pairing with another location identification in an attribute pair; and examining the data structure that contains the previously selected incident types to determine if a currently selected incident type is one of the previously selected incident types.

Analyzing (704) each location identification (778) in each attribute combination entry (760) according to a sequence (780) of the attribute combination entries also includes for each location identification of each attribute combination entry: if the set of unique incident types includes an incident type not selected for pairing with another location identification in an attribute pair, selecting (710) the incident type for pairing with the location identification in an attribute pair and creating (712) an attribute pair of the selected incident type and the location identification. Selecting (710) the incident type for pairing with the location identification in an attribute pair may be carried out by randomly picking one of the incident types; or following a specific pattern for picking one of the incident types from the entry, such a picking the first incident type or the lowest number incident type.

Readers of skill in the art will realize that any number of specific patterns may be utilized for picking one of the incident types from the entry. For example, in a particular embodiment, the incident analyzer (700) is configured to track the number of times that a particular incident type appears in sets of incidents of the attribute combination entries. The incident analyzer may also be configured to create a list that lists each incident type in increasing order of popularity. That is, the list specifies an increasing order of popularity that each incident type appears in the combination entries. The incident analyzer (700) may use this list in selecting (710) the incident type for pairing with the location identification in an attribute pair by picking, according to the list, the least popular incident type that is still available for selection. By picking the least most popular incident types first, the incident analyzer may increase the likelihood that more incident types will be available for selection for pairing with the later location identifications.

Creating (712) an attribute pair of the selected incident type and the location identification may be carried out by storing both the location identification and the selected incident type in a unique incidents list; and storing an indication that the location identification and the selected incident type correspond to each other within the unique incidents list.

The method of FIG. 7 also includes the incident analyzer (700) counting (714) the attribute pairs (770). Counting (714) the attribute pairs (770) may be carried out by maintaining a counter that increments with each addition of an attribute pair in a unique incidents list; or periodically counting number of location identifications, incident types, or attribute pairs within a unique incidents list. In the example of FIG. 7, the number (799) of attribute pairs is the number of unique incidents in the plurality of incidents (786).

For example, each incident in the plurality of incidents may each have one location identification of the group: 'L1', 'L2', 'L3', 'L4', 'L5', 'L6', and 'L7' and one incident type of the group: 'I1', 'I2', 'I3', 'I4', 'I7', and 'I8'. In this plurality of incidents, there may be multiple incidents with the same combination of location identification and incident type and there may be only one incident with the same combination of location identification and incident type. Accordingly to embodiments of the present invention, the incident analyzer is configured to take this plurality of incidents and determine the number of unique incidents (i.e., a unique incident type and a unique location identification). Continuing with this example, the incident analyzer creates the attribute combination entries (760) from this plurality of incidents. The attribute combination entries (760) identify the unique incident types corresponding to a location identification. The incident analyzer (700) analyzes the attribute combination entries (760) according to a sequence.

In this example, if the incident analyzer (700) follows the sequence (780), the 'L1' location identification is analyzed first and an incident type is selected from the set of incident types in the first attribute combination entry (790). Either 'I1' or 'I2' may be selected but in this example, 'I1' is selected for pairing with the 'L1' location identification in a first attribute pair (781). The incident analyzer (700) next analyzes the 'L5' location identification and selects 'I3' incident type for a second attribute pair (782) then selects 'I4' for pairing with the 'L6' location identification in a third attribute pair (783). When the incident analyzer (700) analyzes the third attribute combination entry (792), the incident analyzer would determine that the 'I3' incident type has already been selected for pairing with another location identification (i.e., 'L5'). The 'I2' and 'I7' incident types are both available for selection and pairing with the 'L2' and 'L3' location identifications in a fourth attribute pair (784) and a fifth attribute pair (720), respectively. When the incident analyzer (700) analyzes the fourth attribute combination entry (793), the incident analyzer would determine that the 'I1', 'I3', and 'I7' are all unavailable for selection so the incident analyzer would select 'I8' incident type for pairing with the 'L4' location identification in a sixth attribute pair (721). As there are no more unselected incident types in the fourth attribute combination entry (793), the incident analyzer is unable to select an incident type for pairing with the 'L7' location identification. As a consequence, the 'L7' location identification is not included in the attribute pairs (770). To determine the number of unique incidents, the incident analyzer counts the number of attribute pairs (770), which in this example is six. That is, the incident analyzer in this example may determine that there are six unique incidents in the plurality of incidents.

Determining the number of unique incidents in a plurality of incidents may be useful for a variety of reasons. For example, an incident processing system or an incident analyzer may have a ruleset that is dependent upon the number of unique incidents. A ruleset may contain a set of rules that define how to process incidents and generate appropriate actions based on the incidents. For example, a particular condition of a ruleset may require that there be a set of N incidents in the incidents pool where each incident has a unique incident type and a unique location identification. This condition may be useful in determining a 'breadth of failure' of the system. In a particular embodiment, the incident analyzer (700) of FIG. 7 is configured to determine if this condition is satisfied.

Figure 8:
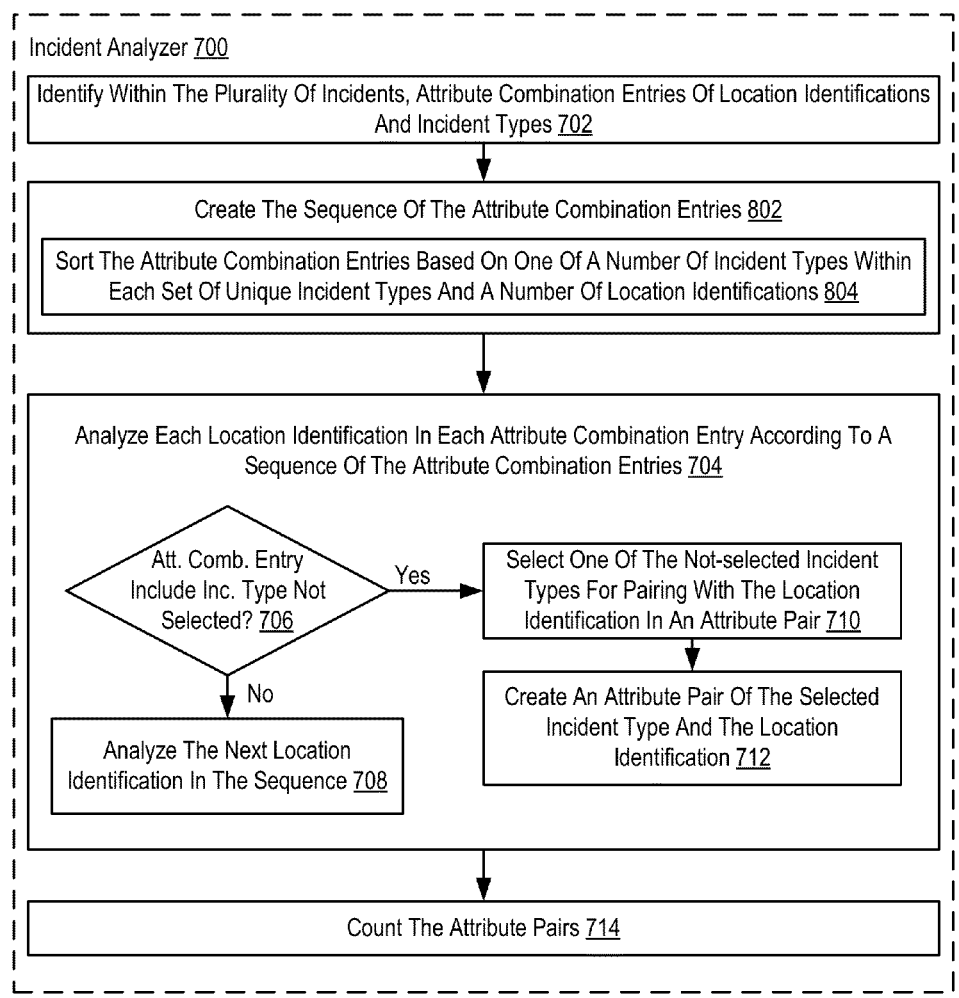
FIG. 8 sets forth a flow chart illustrating an additional method of determining a number of unique incidents in a plurality of incidents for incident processing in a distributed processing system according to embodiments of the present invention.
Figure 8:
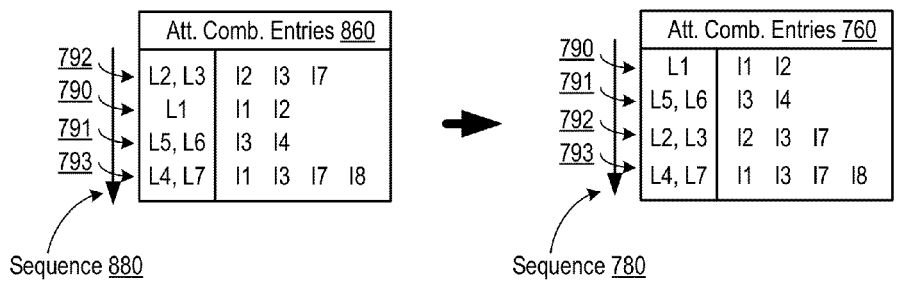

For further explanation, FIG. 8 sets forth a flow chart illustrating an additional method of determining a number of unique incidents in a plurality of incidents for incident processing in a distributed processing system according to embodiments of the present invention. The method of FIG. 8 is similar to the method of FIG. 7 in that the method of FIG. 8 also includes: identifying (702) within the plurality of incidents (786), attribute combination entries (760) of location identifications and incident types; analyzing (704) each location identification (778) in each attribute combination entry (760) according to a sequence (780) of the attribute combination entries; determining (706) whether the set of unique incident types within the attribute combination entry includes an incident type not selected for pairing with another location identification in an attribute pair (770); if the set of unique incident types includes an incident type not selected for pairing with another location identification in an attribute pair, selecting (710) the incident type for pairing with the location identification in an attribute pair and creating (712) an attribute pair of the selected incident type and the location identification; and counting (714) the attribute pairs (770).

The method of FIG. 8, however, also includes creating (802) the sequence (780) of the attribute combination entries (760). Creating (802) the sequence (780) of the attribute combination entries (760) includes sorting (804) the attribute combination entries (760) based on one of a number of incident types within each set of unique incident types and a number of location identifications. Sorting (804) the attribute combination entries (760) based on one of a number of incident types within each set of unique incident types and a number of location identifications may be carried out by sorting the sets of incident types with the fewest location identification pairings to be selected first. For example, the incident analyzer may determine which is smaller, the number of incident types or the number of location identifications and then sort the attribute combination entries based on that determination. Sorting the sets of incident types with the fewest location identification pairs to be selected first may allow later location identifications to have more incident types to choose from.

For example, an incident analyzer processing a first attribute combination entry having a 'L1' location identification with a set of incident types that only includes a 'I1' incident type and a second attribute combination entry having a 'L2' location identification with a set of incident types that include 'I1', 'I3', 'I4', and 'I6'. If the second pair is analyzed first and 'I1' is selected for pairing with the 'L2' location identification then when the first attribute combination entry is analyzed, the 'I1' incident type would not be available for pairing with the 'L1' location identification, resulting in only one attribute pair of ('L2', 'I1'). However, if the first pair is analyzed first following by the second attribute combination entry, two attribute pairs may be created ('L1', 'I1'), ('L2', 'I3'). That is, the sequence that the attribute combination entries are analyzed may impact the number of attribute pairs and ultimately the determined number of unique incidents in the plurality of incidents.

Figure 9:
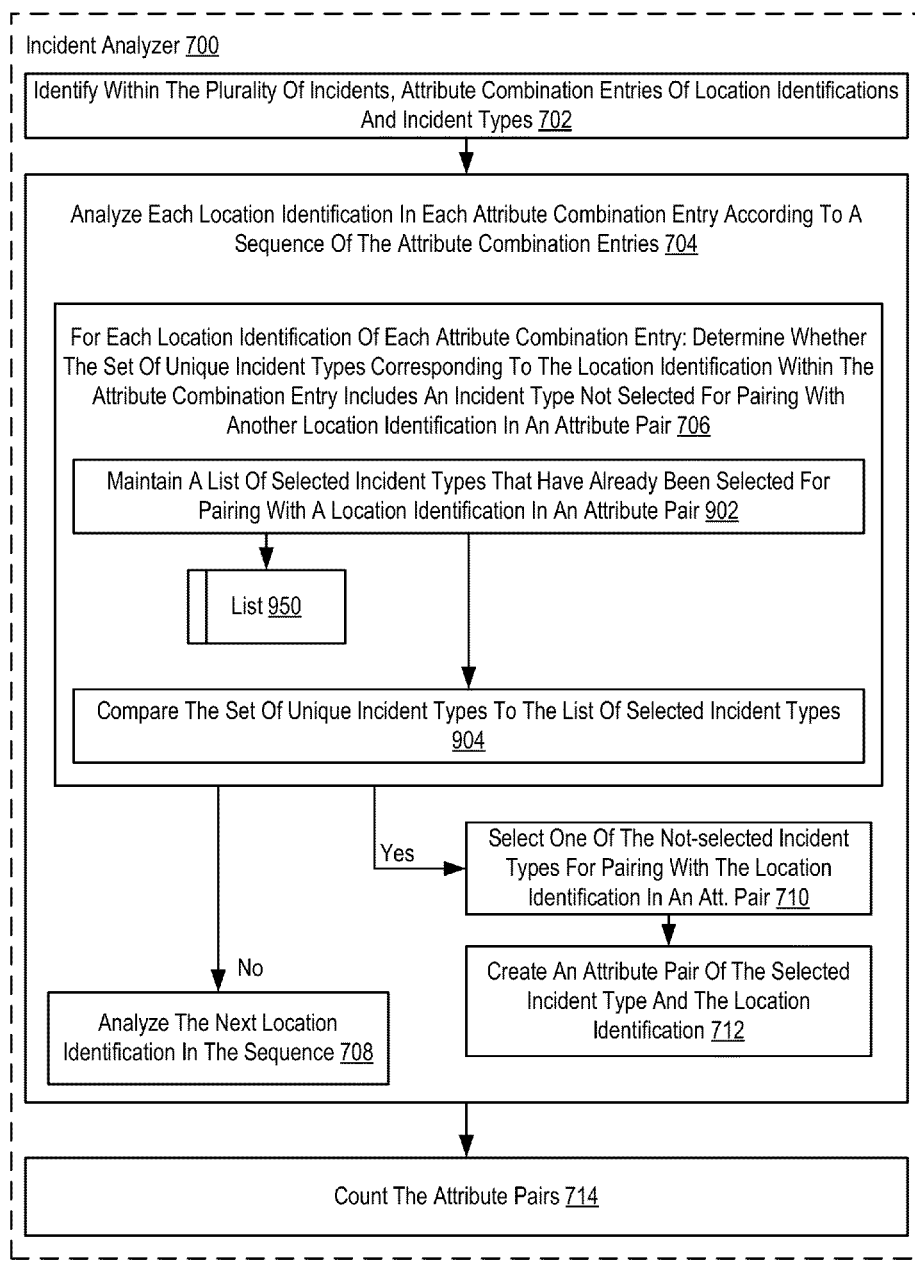
FIG. 9 sets forth a flow chart illustrating an additional method of determining a number of unique incidents in a plurality of incidents for incident processing in a distributed processing system according to embodiments of the present invention.

For further explanation, FIG. 9 sets forth a flow chart illustrating an additional method of determining a number of unique incidents in a plurality of incidents for incident processing in a distributed processing system according to embodiments of the present invention. The method of FIG. 9 is similar to the method of FIG. 7 in that the method of FIG. 9 also includes identifying (702) within the plurality of incidents (786), attribute combination entries (760) of location identifications and incident types; analyzing (704) each location identification (778) in each attribute combination entry (760) according to a sequence (780) of the attribute combination entries; determining (706) whether the set of unique incident types within the attribute combination entry includes an incident type not selected for pairing with another location identification in an attribute pair (770); if the set of unique incident types includes an incident type not selected for pairing with another location identification in an attribute pair, selecting (710) the incident type for pairing with the location identification in an attribute pair and creating (712) an attribute pair of the selected incident type and the location identification; and counting (714) the attribute pairs (770).

In the method of FIG. 9, however, determining (706) whether the set of unique incident types within the attribute combination entry includes an incident type not selected for pairing with another location identification in an attribute pair (770) includes maintaining (902) a list (950) of selected incident types that have already been selected for pairing with a location identification in an attribute pair. Maintaining (902) a list (950) of selected incident types that have already been selected for pairing with a location identification in an attribute pair may be carried out by storing within a data structure, an incident type that is selected for pairing with another location identification in an attribute pair.

In the method of FIG. 9, however, determining (706) whether the set of unique incident types within the attribute combination entry includes an incident type not selected for pairing with another location identification in an attribute pair (770) includes comparing (904) the set of unique incident types to the list of selected incident types. Comparing (904) the set of unique incident types to the list of selected incident types may be carried out by examining the data structure that contains the previously selected incident types to determine if a currently selected incident type is one of the previously selected incident types.

Figure 10:
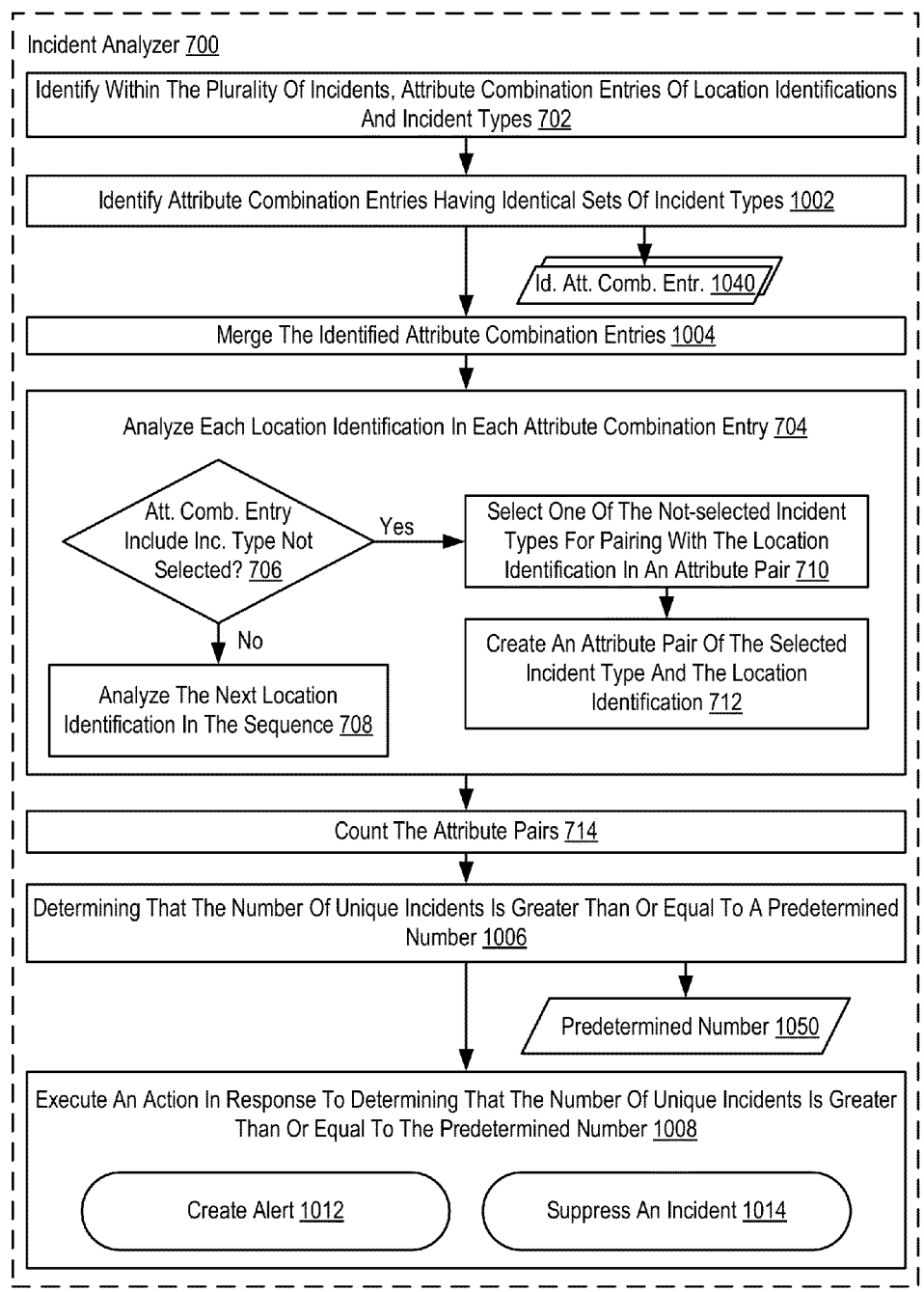
FIG. 10 sets forth a flow chart illustrating an additional method of determining a number of unique incidents in a plurality of incidents for incident processing in a distributed processing system according to embodiments of the present invention.

For further explanation, FIG. 10 sets forth a flow chart illustrating an additional method of determining a number of unique incidents in a plurality of incidents for incident processing in a distributed processing system according to embodiments of the present invention. The method of FIG. 10 is similar to the method of FIG. 7 in that the method of FIG. 10 also includes identifying (702) within the plurality of incidents (786), attribute combination entries (760) of location identifications and incident types; analyzing (704) each location identification (778) in each attribute combination entry (760) according to a sequence (780) of the attribute combination entries; determining (706) whether the set of unique incident types within the attribute combination entry includes an incident type not selected for pairing with another location identification in an attribute pair (770); if the set of unique incident types includes an incident type not selected for pairing with another location identification in an attribute pair, selecting (710) the incident type for pairing with the location identification in an attribute pair and creating (712) an attribute pair of the selected incident type and the location identification; and counting (714) the attribute pairs (770).

The method of FIG. 10 also includes the incident analyzer (700) identifying (1002) attribute combination entries (1040) having identical sets of incident types. Identifying (1002) attribute combination entries (1040) having identical sets of incident types may be carried out by examining the sets of incident types for a matching combination.

The method of FIG. 10 also includes the incident analyzer (700) merging (1004) the identified attribute combination entries (1040). Merging (1004) the identified attribute combination entries (1040) may be carried out by generating an attribute combination entry that includes all of the location identifications and the set of incident types shared by all of the location identifications. In a particular embodiment, each attribute combination entry has only one location identification. That is, location identifications having identical sets of incident types may initially not be merged or may not be merged at all, in which case the location identifications are each placed in a separate attribute combination entry. Said another way, when two attribute combination entries are merged then the location identifications from those entries are added together to form a set of unique location identifications and the set of unique incident types that is common to the entries is used for the new combined entry.

The method of FIG. 10 also includes the incident analyzer (700) determining (1006) that the number (799) of unique incidents is greater than or equal to a predetermined number (1050). Determining (1006) that the number (799) of unique incidents is greater than or equal to a predetermined number (1050) may be carried out by comparing the number (799) to the predetermined number. For example, a particular ruleset may have a condition which requires that there be a set of N incidents in the incidents pool where each incident has a unique incident type and a unique location identification. If the incident analyzer determines that there are N unique incidents, the incident analyzer may determine that the condition is satisfied.

The method of FIG. 10 also includes the incident analyzer (700) executing (1008) an action in response to determining that the number (799) of unique incidents is greater than or equal to the predetermined number (1050). Executing (1008) an action in response to determining that the number (799) of unique incidents is greater than or equal to the predetermined number (1050) may be carried out by deleting, dropping, suppressing, or moving an incident, from the system, to another component of the system, from an incidents pool, or to an incidents pool.

Executing (1008) an action in response to determining that the number (799) of unique incidents is greater than or equal to the predetermined number (1050) includes at least one of creating (1012) an alert and suppressing (1014) an incident. Creating (1012) an alert may be carried out by generating an alert if the number of attribute pairs is above a particular predetermined number. An alert is a refinement of an occurrence, such as an error, based upon more than one incident and therefore provides an identification of the occurrence in the context of its operation in the distributed processing system. Often an alert may be a notification of a particular error type of occurrence that is identified in dependence upon the plurality of incidents received from one or more components of the data processing system, such as, for example, a link failure among a plurality of devices each of which are producing many incidents based upon the single link failure, or a power failure provoking thousands of incidents, and so on. Alerts are often implemented as messages to be sent through a data communications network or shared memory. Typical alerts according to embodiments of the present invention have attributes attached to them based upon the attributes of the incidents received from which they are identified.

Suppressing (1014) an incident may be carried out by based on incident suppression rules. Incident suppression rules are configurable predetermined rules for suppressing one or more incidents. Such suppression rules are typically predetermined to delete, drop, or otherwise ignore those suppressed incidents. Such rules are also flexible and may be tailored to a particular distributed computing system and its functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of determining a number of unique incidents in a plurality of incidents for incident processing in a distributed processing system, the method comprising:
   identifying within the plurality of incidents, by an incident analyzer, attribute combination entries of location identifications and incident types, wherein each attribute combination entry has one location identification and a set of unique incident types corresponding to the location identification;
   analyzing each location identification in each attribute combination entry according to a sequence of the attribute combination entries including for each location identification of each attribute combination entry:
      determining whether the set of unique incident types within the attribute combination entry includes an incident type not selected for pairing with another location identification in an attribute pair;
      if the set of unique incidents types includes an incident type not selected for pairing with another location identification in an attribute pair, selecting the incident type for pairing with the location identification in an attribute pair and creating an attribute pair of the selected incident type and the location identification; and
   counting the attribute pairs; wherein the number of attribute pairs is the number of unique incidents in the plurality of incidents.

2. The method of claim 1 further comprising creating the sequence of the attribute combination entries; wherein creating the sequence of the attribute combination entries includes sorting the attribute combination entries based on one of a number of incident types within each set of unique incident types and a number of location identifications.

3. The method of claim 1 wherein determining whether the set of unique incident types corresponding to the location identification within the attribute combination entry includes an incident type not selected for pairing with another location identification in an attribute pair further comprises:
   maintaining a list of selected incident types that have already been selected for pairing with a location identification in an attribute pair; and
   comparing the set of unique incident types to the list of selected incident types.

4. The method of claim 1 further comprising:
   identifying attribute combination entries having identical sets of incident types; and
   merging the identified attribute combination entries.

5. The method of claim 1 further comprising:
   determining that the number of unique incidents is greater than or equal to a predetermined number; and
   executing an action in response to determining that the number of unique incidents is greater than or equal to the predetermined number.

6. The method of claim 1 wherein executing an action includes at least one of creating an alert and suppressing an incident.

* * * * *